(12) United States Patent
Liu

(10) Patent No.: US 8,896,565 B2
(45) Date of Patent: Nov. 25, 2014

(54) IN-CELL TOUCH SENSING PANEL

(75) Inventor: Tzu-Wei Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1240 days.

(21) Appl. No.: 12/755,098

(22) Filed: Apr. 6, 2010

(65) Prior Publication Data

US 2011/0242044 A1    Oct. 6, 2011

(51) Int. Cl.
*G06F 3/045*   (2006.01)
*G06F 3/041*   (2006.01)

(52) U.S. Cl.
CPC .................... *G06F 3/0416* (2013.01)
USPC .......................................... 345/174; 345/173

(58) Field of Classification Search
USPC ........................................................ 345/173
See application file for complete search history.

(56) References Cited

U.S. PATENT DOCUMENTS

| 2007/0040814 A1* | 2/2007 | Lee et al. ....................... 345/173 |
| 2008/0054164 A1 | 3/2008 | Johansson |
| 2011/0242044 A1* | 10/2011 | Liu ................................ 345/174 |

FOREIGN PATENT DOCUMENTS

EP    2085810 A1    8/2009

* cited by examiner

*Primary Examiner* — Jesus Hernandez
(74) *Attorney, Agent, or Firm* — Tim Tingkang Xia, Esq.; Morris, Manning & Martin, LLP

(57) ABSTRACT

The present invention in one aspect relates to an in-cell touch panel. In one embodiment, the in-cell touch panel includes at least one touch sensing device configured such that when a touch occurs, it responsively generates a first sensing signal and a second sensing signal that is different from the first sensing signal, and at least one reverse amplification circuit electrically coupled to the at least one touch sensing device for amplifying the difference between the first and second sensing signals.

8 Claims, 18 Drawing Sheets

(a)

(b)

(a)

(b)

(a)

(b)

(a)

(b)

(a)

(b)

(a)

(b)

IN-CELL TOUCH SENSING PANEL

FIELD OF THE INVENTION

The present invention relates generally to a touch panel, and more particularly, to an in-cell touch sensing panel that utilizes a reverse amplification circuit to amplify sensed touch signals so as to improve the sensitivity of the in-cell touch sensing panel.

BACKGROUND OF THE INVENTION

Touch sensing or touch position detection technology capable of providing a natural interface between an electronic system and user has found widespread applications in a variety of fields, for example, in mobile phones, personal digital assistants (PDAs), automatic teller machines (ATMs), game machines, medical devices, liquid crystal display (LCD) devices, light emitting diode (LED) devices, plasma display panel (PDP) devices, computing devices, and the like, where a user may input desired information and/or operate the electronic system through a touch sensing device associated with the electronic system. A touch sensing device typically includes a controller, a sensing circuit having a plurality of touch sensors and a network of control lines electrically connecting the plurality of touch sensors to the controller, and a touch panel associated with the plurality of touch sensors.

Recently, in-cell touch sensing panels in which an LCD incorporates touch sensors have been developed. Those touch sensors sense the pressure, capacitance or ambient light brightness difference caused by a touch of a finger or a stylus and provide electrical signals corresponding thereto for the LCD.

FIG. 16 shows a circuit diagram of a conventional in-cell touch sensor including a reset thin-film transistor (TFT), RST-TFT, an amplification TFT, AMP-TFT, a selection (read) TFT, SEL-TFT, a storage capacitor, $C_{ref}$, and a liquid crystal capacitor, $C_{lc}$. For such a touch sensor, a touch detection includes three steps: initialization, charging and readout.

Initialization: when the voltage level of Gate line G1 turns high, RST-TFT is turned on. Accordingly, the voltage level at the node $V_A$ is initially set to $V_{init}$.

Charging: when the voltage level of Gate line G1 turns low, RST-TFT is turned off. The voltage level at the node $V_A$ is shifted to a certain level if a touch exists, $$V_A = V_{init} - \frac{C_{ref}}{C_{ref} + C_{lc} + C_p} \cdot \Delta V,$$

where $C_{ref}$ is a reference capacity, Clc is a liquid crystal capacity of the pixel, which is variable with a touch event, Cp is a parasitic capacity of the pixel, and $\Delta V$ is the difference between the high voltage level and the low voltage level of the Gate line G1.

Readout: when the voltage level of Gate line G2 turns high, SEL-TFT is turned on, thereby reading out the signal (from a sense line).

FIG. 17 shows a conventional photo-type touch sensor includes a source follower TFT, M1, a reset TFT, M2, a column bias TFT, M3, a photo sensor, PD and a storage capacitor, $C_{INT}$. When M2 is turned on, the storage capacitor $C_{INT}$ is charged to a certain voltage level, and the photo sensor PD leaks according to the intensity of its ambient light. As a result, $V_{int}$ is reduced to a different level after a period of time. When RWS is pulsed on, the level of $V_{int}$ is increased, because of the capacitive coupling. Further, the voltage level of Vpix is also increased from the level of $V_{SS}$ to a certain level, for example, a power supply voltage $V_{DD}$, thereby determining that a touch event occurs. FIG. 18 shows timing charts of operation signals of the photo-type touch sensor as disclosed above.

For the touch sensor designs, the sensed touch signal amplification is utilized with a Mamp TFT, for example, AMP-TFT in FIG. 16, or M1 in FIG. 17. Sometimes, sensed touch signals may be very weak, so that even after the signal amplification, one may still be unable to determine whether a touch event exists. Thus, the sensitivity of the touch sensor designs is limited.

Therefore, a heretofore unaddressed need exists in the art to address the aforementioned deficiencies and inadequacies.

SUMMARY OF THE INVENTION

In one aspect, the present invention relates to an in-cell touch panel. In one embodiment, the in-cell touch panel includes a plurality of pixels spatially arranged in a matrix; a plurality of scanning lines, each scanning line electrically coupled to a corresponding pixel row of the pixel matrix; at least one touch sensing device electrically coupled between two neighboring scanning lines and associated with a pixel therebetween; and at least one reverse amplification circuit.

The at least one reverse amplification circuit has a first thin-film transistor (TFT) having a gate electrically coupled to the at least one touch sensing device, a source and a drain configured to receive a first bias voltage, Vdh; a second TFT having a gate electrically coupled to the at least one touch sensing device, a source configured to receive a second bias voltage, Vdl, and a drain electrically coupled to the source of the first TFT; an amplification TFT having a gate electrically coupled to both the source of the first TFT and the drain of the second TFT, a source and a drain configured to receive a power supply voltage, VDD; and a selection TFT having a gate electrically coupled to one of the two neighboring scanning lines, a source electrically coupled to a signal readout line and a drain electrically coupled to the source of the amplification TFT, where Vdh>Vdl.

The at least one touch sensing device is configured such that when a touch occurs, it causes the gate voltage level of one of the first TFT and the second TFT to increase and the voltage level of the other to decrease.

The at least one touch sensing device includes a photo-type, press-type, capacitive-type or hybrid-type touch sensing device.

In one embodiment, the at least one touch sensing device includes a touch sensing capacitor, Clc, electrically coupled between the gate of the second TFT and a common voltage, Vcom; a reference capacitor Cref electrically coupled between the gate of the second TFT and a node Va that is electrically coupled to the gate of the first TFT; and a reset TFT having a gate electrically coupled to one of the two neighboring scanning lines, a source electrically coupled to the node Va, and a drain electrically coupled to a readout control signal line. The at least one touch sensing device may further include an additional capacitor C1 electrically coupled between the gate of the first TFT and the node Va. Also, the at least one touch sensing device may further include a photo sensor.

In another embodiment, the at least one touch sensing device is characterized with a first charge sharing circuit and a second charge sharing circuit. Each charge sharing circuit has a first transistor, T1, having a gate electrically coupled to the first one of the two neighboring scanning lines, a source configured to receive one of the first and second bias voltages Vdh and Vdl, and a drain electrically coupled to a first node, respectively; a second transistor, T2, having a gate electrically coupled to the second one of the two neighboring scanning lines, a source electrically coupled to the first node, and a drain electrically coupled to a second node, respectively; a third transistor, T3, having a gate electrically coupled to the first one of the two neighboring scanning lines, a source electrically coupled to the second node, and a drain configured to receive the other of the first and second bias voltages Vdh and Vdl, respectively; a touch sensing capacitor, Clc, electrically coupled between the first node and a common voltage, Vcom; and a reference capacitor Cref electrically coupled between the second node and a reference voltage, VSS.

When the source of the first transistor T1 receives the first bias voltage Vdh and the drain of the third transistor T3 receives the second bias voltage Vdl, the first node of the first charge sharing circuit is electrically coupled to the gate of the first TFT. When the source of the first transistor T1 receives the second bias voltage Vdl and the drain of the third transistor T3 receives the first bias voltage Vdh, the first node of the second charge sharing circuit is electrically coupled to the gate of the second TFT.

Additionally, the in-cell touch panel further includes a readout circuit electrically couple to the readout signal line for outputting a touch sensing signal. The readout circuit in one embodiment includes an operational amplifier (op-amp) having an inverting terminal electrically coupled to the readout signal line and a non-inverting terminal configured to receive a reference voltage, Vref, and an output terminal for outputting the touch sensing signal; a capacitor, Cf, electrically coupled between the inverting terminal and the output terminal of the op-amp; and a switch SW electrically coupled with the capacitor Cf in parallel.

In another aspect, the present invention relates to an in-cell touch panel. In one embodiment, the in-cell touch panel includes a plurality of pixels spatially arranged in a matrix; a plurality of scanning lines, each scanning line electrically coupled to a corresponding pixel row of the pixel matrix; at least one touch sensing device electrically coupled between two neighboring scanning lines and associated with a pixel therebetween; and at least one reverse amplification circuit. The at least one reverse amplification circuit has an amplification TFT having a gate electrically coupled to the at least one touch sensing device, a source and a drain electrically coupled to the at least one touch sensing device; and a selection TFT having a gate electrically coupled to one of the two neighboring scanning lines, a source electrically coupled to a signal readout line and a drain electrically coupled to the source of the amplification TFT. The at least one touch sensing device is configured such that when a touch occurs, it causes a current signal to flow between the amplification and selection TFTs in a reverse direction relative to that when no touch occurs.

In one embodiment, the at least one touch sensing device includes a photo-type, press-type, capacitive-type or hybrid-type touch sensing device.

In one embodiment, the at least one touch sensing device is characterized with a first charge sharing circuit and a second charge sharing circuit. Each charge sharing circuit includes a first transistor, T1, having a gate electrically coupled to the first one of the two neighboring scanning lines, a source electrically coupled to one of a first bias voltage, Vdh, and a second bias voltage, Vdl, and a drain electrically coupled to a first node, respectively, where Vdh>Vdl; a second transistor, T2, having a gate electrically coupled to the second one of the two neighboring scanning lines, a source electrically coupled to the first node, and a drain electrically coupled to a second node, respectively; a third transistor, T3, having a gate electrically coupled to the first one of the two neighboring scanning lines, a source electrically coupled to the second node, and a drain electrically coupled to the other of the first bias voltage Vdh and the second bias voltage Vdl, respectively; a touch sensing capacitor, Clc, electrically coupled between the first node and a common voltage, Vcom; and a reference capacitor Cref electrically coupled between the second node and a reference voltage, VSS.

In one embodiment, the first node of the first charge sharing circuit is electrically coupled to the gate of the amplification TFT, when the source of the first transistor T1 receives the first bias voltage Vdh and the drain of the third transistor T3 receives the second bias voltage Vdl. The first node of the second charge sharing circuit is electrically coupled to the drain of the amplification TFT, when the source of the first transistor T1 receives the second bias voltage Vdl and the drain of the third transistor T3 receives the first bias voltage Vdh.

The in-cell touch panel further includes a readout circuit electrically couple to the readout signal line for outputting a touch sensing signal.

In yet another aspect, the present invention relates to an in-cell touch panel. In one embodiment, the in-cell touch panel includes a plurality of pixels spatially arranged in a matrix; a plurality of scanning lines, each scanning line electrically coupled to a corresponding pixel row of the pixel matrix; at least one touch sensing device electrically coupled between two neighboring scanning lines and associated with a pixel therebetween; and at least one reverse amplification circuit. The at least one reverse amplification circuit has a first amplification TFT having a gate electrically coupled to the at least one touch sensing device, a source and a drain configured to receive a first voltage signal V1; a second amplification TFT having a gate electrically coupled to the at least one touch sensing device, a source configured to receive a second voltage signal V2 and a drain electrically coupled to the source of the first amplification TFT; and a selection TFT having a gate electrically coupled to one of the two neighboring scanning lines, a source electrically coupled to a signal readout line and a drain electrically coupled to both the source of the first amplification TFT and the drain of the second amplification TFT. The at least one touch sensing device is configured such that when a touch occurs, it causes a gate voltage level of one of the first amplification TFT and the second amplification TFT to increase and the gate voltage level of the other to decrease. The at least one touch sensing device includes a photo-type, press-type, capacitive-type or hybrid-type touch sensing device.

In one embodiment, $V1=V_{DD}$ and $V2=V_{GND}$, where $V_{DD}$ is a power supply voltage and VGND is a ground voltage.

In one embodiment, the at least one touch sensing device is characterized with a first charge sharing circuit and a second charge sharing circuit. Each charge sharing circuit has a first transistor, T1, having a gate electrically coupled to the first one of the two neighboring scanning lines, a source electrically coupled to one of a first bias voltage, Vdh, and a second bias voltage, Vdl, and a drain electrically coupled to a first node, respectively, where Vdh>Vdl; a second transistor, T2, having a gate electrically coupled to the second one of the two neighboring scanning lines, a source electrically coupled to the first node, and a drain electrically coupled to a second node, respectively; a third transistor, T3, having a gate electrically coupled to the first one of the two neighboring scanning lines, a source electrically coupled to the second node, and a drain electrically coupled to the other of the first bias voltage Vdh and the second bias voltage Vdl, respectively; a touch sensing capacitor, Clc, electrically coupled between the first node and a common voltage, Vcom; and a reference capacitor Cref electrically coupled between the second node and a reference voltage, VSS.

The first node of the first charge sharing circuit is electrically coupled to the gate of the first amplification TFT, when the source of the first transistor T1 receives the first bias voltage Vdh and the drain of the third transistor T3 receives the second bias voltage Vdl. The first node of the second charge sharing circuit is electrically coupled to the gate of the second amplification TFT, when the source of the first transistor T1 receives the second bias voltage Vdl and the drain of the third transistor T3 receives the first bias voltage Vdh.

In a further aspect, the present invention relates to an in-cell touch panel. In one embodiment, the in-cell touch panel includes a plurality of pixels spatially arranged in a matrix; a plurality of scanning lines, each scanning line electrically coupled to a corresponding pixel row of the pixel matrix; at least one touch sensing device electrically coupled between two neighboring scanning lines and associated with a pixel therebetween; and at least one reverse amplification circuit. The at least one reverse amplification circuit has a first amplification TFT having a gate electrically coupled to the at least one touch sensing device, a source and a drain configured to receive a first voltage signal V1; a first selection TFT having a gate electrically coupled to one of the two neighboring scanning lines, a source electrically coupled to a first signal readout line for output a first output signal, Vout1, and a drain electrically coupled to the source of the first amplification TFT, a second amplification TFT having a gate electrically coupled to the at least one touch sensing device, a source and a drain configured to receive a second voltage signal V2; and a second selection TFT having a gate electrically coupled to the one of the two neighboring scanning lines, a source electrically coupled to a second signal readout line for output a second output signal, Vout2, and a drain electrically coupled to the source of the second amplification TFT. The at least one touch sensing device includes a photo-type, press-type, capacitive-type or hybrid-type touch sensing device.

The at least one touch sensing device is characterized with a first charge sharing circuit and a second charge sharing circuit. Each charge sharing circuit has a first transistor, T1, having a gate electrically coupled to the first one of the two neighboring scanning lines, a source electrically coupled to one of a first bias voltage, Vdh, and a second bias voltage, Vdl, and a drain electrically coupled to a first node, respectively, where Vdh>Vdl; a second transistor, T2, having a gate electrically coupled to the second one of the two neighboring scanning lines, a source electrically coupled to the first node, and a drain electrically coupled to a second node, respectively; a third transistor, T3, having a gate electrically coupled to the first one of the two neighboring scanning lines, a source electrically coupled to the second node, and a drain electrically coupled to the other of the first bias voltage Vdh and the second bias voltage Vdl, respectively; a touch sensing capacitor, Clc, electrically coupled between the first node and a common voltage, Vcom; and a reference capacitor Cref electrically coupled between the second node and a reference voltage, VSS.

In one embodiment, V1=V2=$V_{DD}$, where $V_{DD}$ is a power supply voltage. The first node of the first charge sharing circuit is electrically coupled to the gate of the first amplification TFT, when the source of the first transistor T1 receives the first bias voltage Vdh and the drain of the third transistor T3 receives the second bias voltage Vdl. The first node of the second charge sharing circuit is electrically coupled to the gate of the second amplification TFT, when the source of the first transistor T1 receives the second bias voltage Vdl and the drain of the third transistor T3 receives the first bias voltage Vdh.

In another embodiment, V1=$V_{DD}$, V2=$V_{EE}$, where $V_{DD}$ is a power supply voltage, and $V_{EE}$ is a negative voltage. The first node of one of the first and second charge sharing circuits is electrically coupled to the gates of the first and second amplification TFTs.

In yet a further aspect, the present invention relates to an in-cell touch panel. In one embodiment, the in-cell touch panel includes at least one touch sensing device configured such that when a touch occurs, it responsively generates a first sensing signal and a second sensing signal that is different from the first sensing signal; and at least one reverse amplification circuit electrically coupled to the at least one touch sensing device for amplifying the difference between the first and second sensing signals. The at least one touch sensing device includes a photo-type, press-type, capacitive-type or hybrid-type touch sensing device.

In one embodiment, the at least one reverse amplification circuit includes a first amplification TFT and a second amplification TFT, each amplification TFT having a gate eclectically coupled to the at least one touch sensing device, a source eclectically coupled to an output device and a drain configured to receive a corresponding bias voltage such that the first and second sensing signals causes a first current flowing through between the drain and source of the first amplification TFT and a second current flowing through between the drain and source of the second amplification TFT in an opposite direction to that of the first current.

In another embodiment, the at least one reverse amplification circuit includes a first amplification TFT and a second amplification TFT, each amplification TFT having a gate eclectically coupled to the at least one touch sensing device, a source eclectically coupled to an output device and a drain configured to receive a corresponding bias voltage such that the first and second sensing signals causes the voltage level causes a gate voltage level of one of the first amplification TFT and the second amplification TFT to increase and the gate voltage level of the other to decrease.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
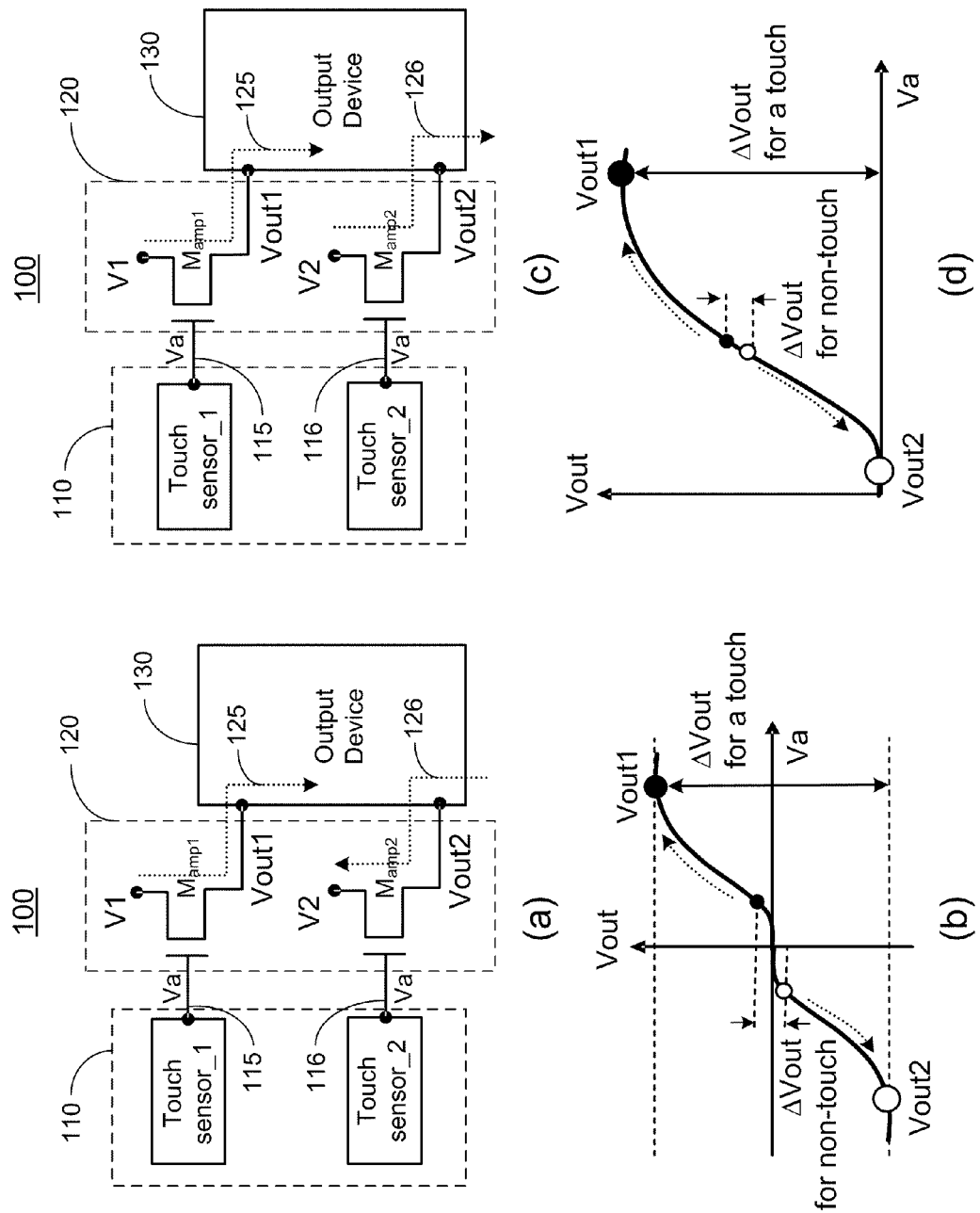
FIG. 1 shows schematically an in-cell touch sensing panel according to one embodiment of the present invention, (a) and (c) a block diagram of the in-cell touch sensing panel, and (b) and (d) plots of the output voltages against the touch strength.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

As used herein, the terms "comprising," "including," "having," "containing," "involving," and the like are to be understood to be open-ended, i.e., to mean including but not limited to.

The description will be made as to the embodiments of the present invention in conjunction with the accompanying drawings of FIGS. 1-15. In accordance with the purposes of this invention, as embodied and broadly described herein, this invention, in one aspect, relates to an in-cell touch sensing panel that utilizes a reverse amplification circuit to amplify the difference of sensed touch signals so as to improve the sensitivity of the in-cell touch sensing panel.

The in-cell touch panel according to the present invention incorporates with an LCD panel formed with liquid crystal cells and pixel elements with each associating with a corresponding liquid crystal cell and having a liquid crystal capacitor, Clc, and a storage capacitor, Cref, a TFT electrically coupled with the liquid crystal capacitor Clc and the storage capacitor Cref. The liquid crystal cells are formed between a first substrate and a second substrate. These pixel elements are substantially arranged in the form of a matrix having a number of pixel rows and a number of pixel columns. Further, there is a plurality of scanning lines with each scanning line electrically coupled to a corresponding pixel row of the pixel matrix, and a plurality of data lines with each data line electrically coupled to a corresponding pixel column of the pixel matrix. The in-cell touch panel includes one or more touch sensing devices with each touch sensing device electrically coupled between two neighboring scanning lines and associated with a pixel therebetween, and one or more reverse amplification circuits coupled to the one or more touch sensing devices. The one or more touch sensing devices and the one or more reverse amplification circuits can be formed within the pixels of the LCD panel or in a touch panel that are disposed on the LCD panel.

Without intend to limit the scope of the invention, a touch sensing device and a reverse amplification circuit utilized in an in-cell touch sensing panel according to the embodiments of the present invention and preliminary touch detection results of the same are described below in details.

Referring to FIG. 1, an in-cell touch panel 100 is shown according to one embodiment of the present invention. The in-cell touch panel 100 includes a touch sensing device 110 and a reverse amplification circuit 120 electrically coupled to the touch sensing device 110. An output device 130 is utilized to electrically couple the reverse amplification circuit 120 for outputting the amplified touch sensing signals.

The touch sensing device 110 can be a photo-type, press-type, capacitive-type or hybrid-type touch sensing device. The touch sensing device 110 may include a touch sensor_1 and a touch sensor_2 configured such that when a touch occurs, the touch sensor_1 and the touch sensor_2 responsively generates a first sensing signal 115 and a second sensing signal 116 that is different from the first sensing signal 115, respectively.

The reverse amplification circuit 120 includes a first amplification TFT, $M_{amp1}$, having a gate eclectically coupled to the touch sensor_1 for receiving the first sensing signal 115, a source eclectically coupled to the output device 130 and a drain configured to receive a first bias voltage V1, and a second amplification TFT, $M_{amp2}$, having a gate eclectically coupled to the touch sensor_2 for receiving the second sensing signal 116, a source eclectically coupled to the output device 130 and a drain configured to receive a second bias voltage V2.

By appropriately configuring the touch sensor_1 and the touch sensor_2, the levels of the first bias voltage V1 and the second bias voltage V2, the first and second sensing signals 115 and 116 can cause a first current 125 flowing through between the drain and source of the first amplification TFT $M_{amp1}$ and a second current 126 flowing through between the drain and source of the second amplification TFT $M_{amp2}$ in an opposite direction to that of the first current 125, as shown in FIG. 1(a), or in the same direction as that of the first current 126, as shown in FIG. 1(c). Alternatively, the first and second sensing signals 115 and 116 may cause the voltage level of one of the gate voltage levels of the first amplification TFT $M_{amp1}$ and the second amplification TFT $M_{amp2}$ to increase, while the voltage level of the other to decrease.

Accordingly, the output voltages Vout1 from the source of the first amplification TFT $M_{amp1}$ and Vout2 from the source of the second amplification TFT $M_{amp2}$ are processed by the output device 130 in a comparator mode so as to be differentially amplified therein, as shown in FIGS. 1(b) and 1(d).

Figure 2:
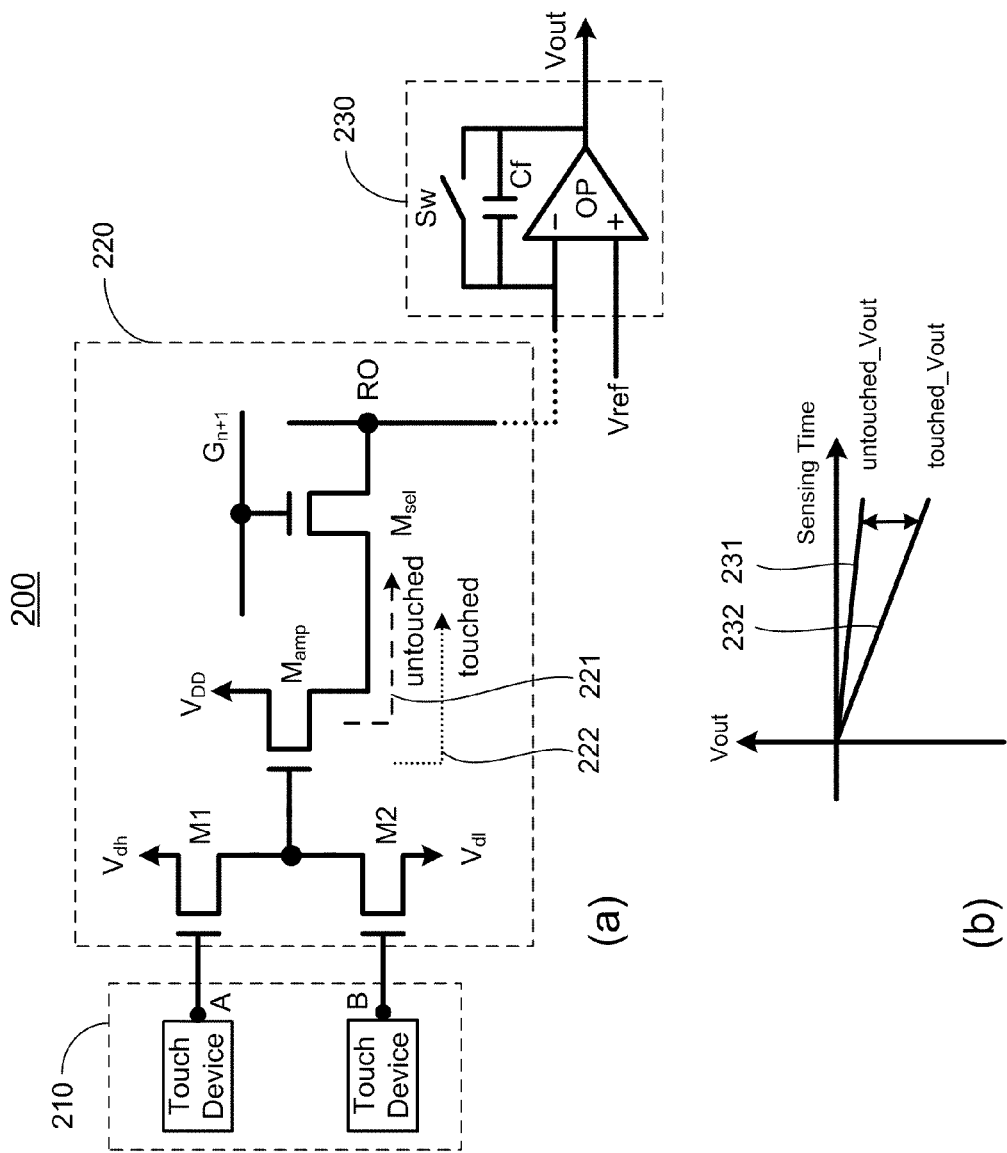
FIG. 2 shows schematically an in-cell touch sensing panel according to another embodiment of the present invention, (a) a circuit diagram of the in-cell touch sensing panel, and (b) plots of the output voltages against the sensing time.
Figure 3:
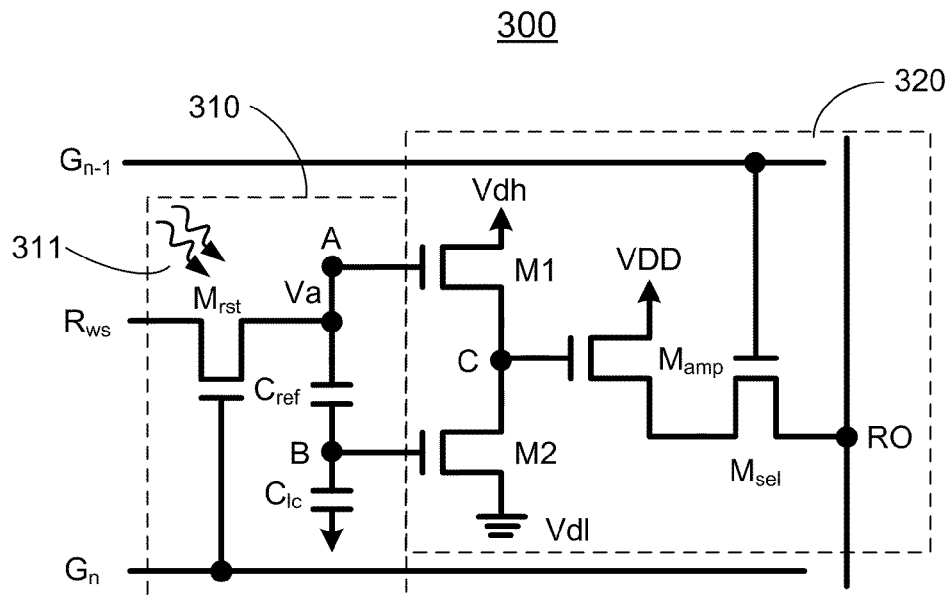
FIG. 3 shows schematically an in-cell touch sensing panel according to one embodiment of the present invention, (a) a circuit diagram of the in-cell touch sensing panel, and (b) plots of the output voltages in different conditions.
Figure 3:
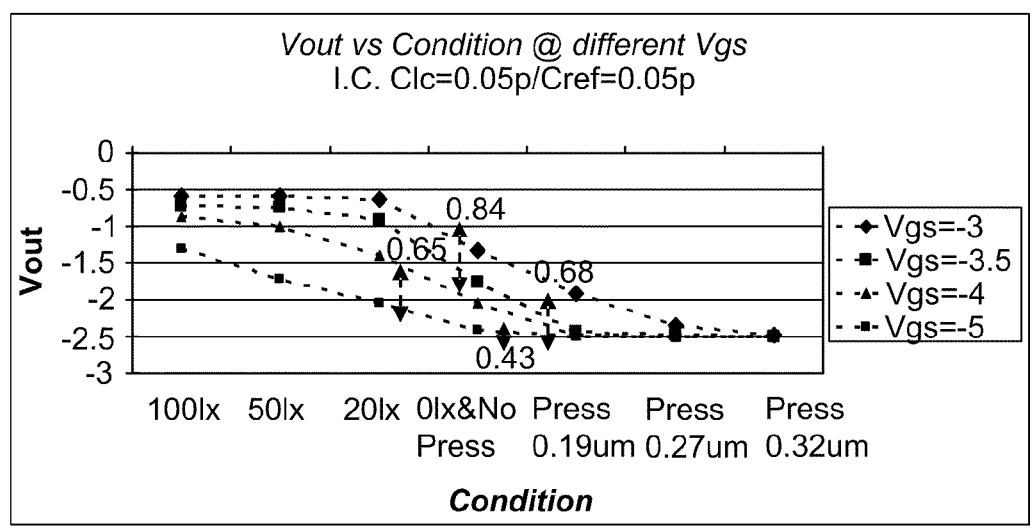
Figure 4:
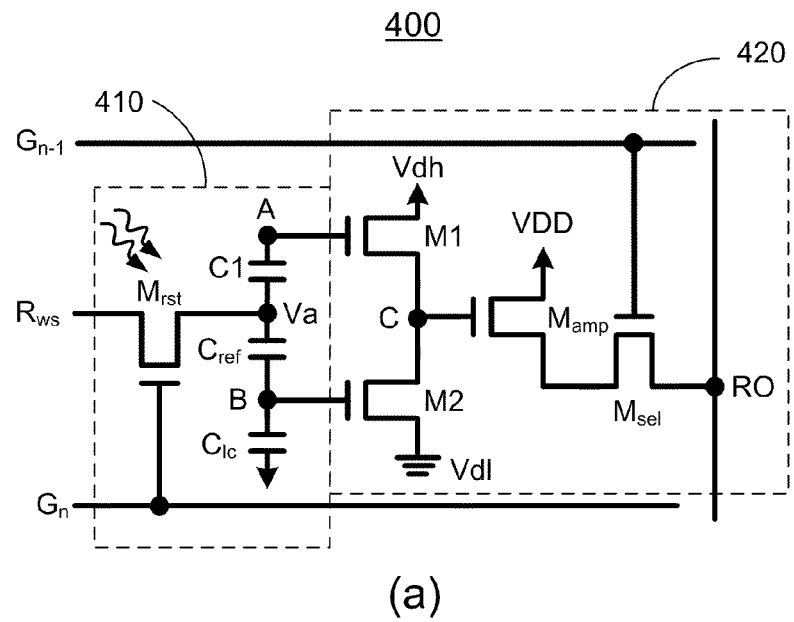
FIG. 4 shows schematically an in-cell touch sensing panel according to another embodiment of the present invention, (a) a circuit diagram of the in-cell touch sensing panel, and (b) plots of the output voltages in different conditions.
Figure 4:
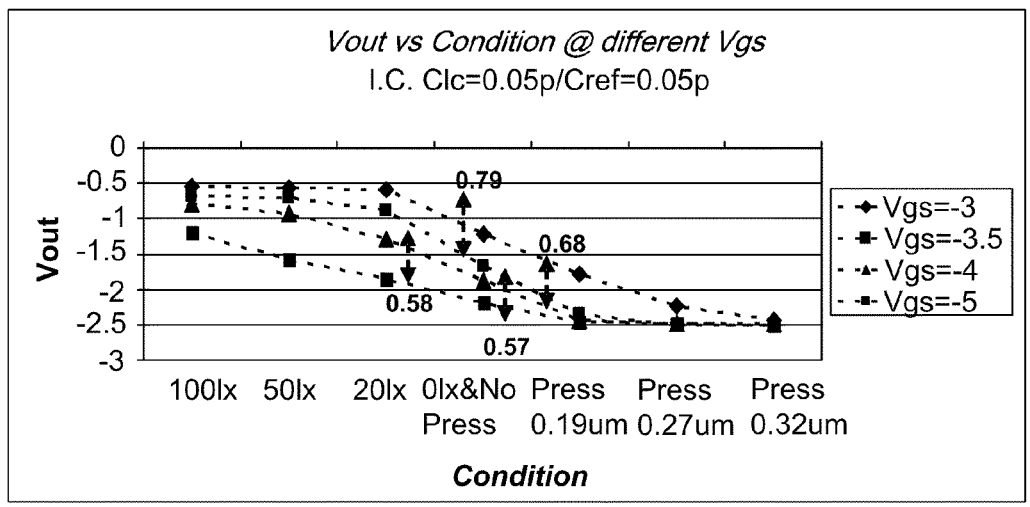

FIG. 2 shows schematically an in-cell touch panel 200 according to one embodiment of the present invention. Similar to the in-cell touch panel 100 shown in FIG. 1, the in-cell touch panel 200 has a touch sensing device 210, a reverse amplification circuit 220 electrically coupled to the touch sensing device 210, and a readout circuit (output device) 230 electrically coupled the reverse amplification circuit 220 for outputting the amplified touch sensing signal, Vout.

As shown in FIG. 2(a), the reverse amplification circuit 220 has a first TFT, M1, a second TFT, M2, an amplification TFT, $M_{amp}$, and a selection TFT, $M_{sel}$. The first TFT M1 has a gate electrically coupled to the touch sensing device 210 via a node A, a source and a drain configured to receive a first bias voltage, Vdh. The second TFT M2 has a gate electrically coupled to the touch sensing device 210 via a node B, a source configured to receive a second bias voltage, Vdl, and a drain electrically coupled to the source of the first TFT M1, where Vdh>Vdl. The amplification TFT $M_{amp}$ has a gate electrically coupled to both the source of the first TFT M1 and the drain of the second TFT M2, a source and a drain configured to receive a power supply voltage, VDD. The selection TFT $M_{sel}$ has a gate electrically coupled to a scanning line, $G_{n+1}$, a source electrically coupled to a signal readout line, RO, and a drain electrically coupled to the source of the amplification TFT $M_{amp}$.

The touch sensing device 210 includes a photo-type, press-type, capacitive-type or hybrid-type touch sensing device, and is configured such that when a touch occurs, it causes the gate voltage level of one of the first TFT M1 and the second TFT M2 to increase and the voltage level of the other to decrease. For example, when no touch exists, a current flow 221 from the amplification TFT $M_{amp}$ to the readout TFT $M_{sel}$ is very small. Accordingly, the output voltage Vout 231 from the readout circuit 230 is small, as shown in FIG. 2(b). When a touch occurs, the touch signal generated from the touch sensing device 210 causes the voltage level at the gate of the first TFT M1 to be raised, while the voltage level at the gate of the second TFT M2 to be lowered. Thus, after passing through the first and second TFTs M1 and M2, the voltage difference between the first and second TFTs M1 and M2 is increased dramatically. Accordingly, a current flow 222 from the amplification TFT $M_{amp}$ to the readout TFT $M_{sel}$ is very large, comparing to the current flow 221. As a result, once a touch event exists, the output voltage Vout 232 from the output device 230 in response to the touch event is significantly amplified, as shown in FIG. 2(b).

The readout circuit 230 electrically coupled to the readout signal line RO for outputting a touch sensing signal. In this exemplary embodiment shown in FIG. 2, the readout circuit 230 includes an operational amplifier (op-amp), OP, having an inverting terminal electrically coupled to the readout signal line RO and a non-inverting terminal configured to receive a reference voltage, Vref, and an output terminal for outputting the touch sensing signal, Vout, a capacitor, Cf, electrically coupled between the inverting terminal and the output terminal of the op-amp; and a switch SW electrically coupled with the capacitor Cf in parallel.

Other types of readout circuits or IC can also be utilized to practice the present invention.

Referring to FIG. 3(a), an in-cell touch panel 300 is shown according to one embodiment of the present invention. The in-cell touch panel 300 has a touch sensing device 310 and a reverse amplification circuit 320 electrically coupled to the touch sensing device 310. The reverse amplification circuit 320 has the same circuit as that of the reverse amplification circuit 220 shown in FIG. 2(a).

In this exemplary embodiment, the touch sensing device 310 is a hybrid type touch sensing device that includes a photo sensor 311 for detecting the intensity of the ambient light, and a press type sensor, indicated by $C_{lc}$. Specifically, the touch sensing device 310 includes a touch sensing capacitor, $C_{lc}$, a storage (reference) capacitor, $C_{ref}$, and a reset TFT, $M_{rst}$. The touch sensing capacitor $C_{lc}$ is electrically coupled between the gate of the second TFT M2 of the reverse amplification circuit 320 and a common voltage, Vcom. The reference capacitor $C_{ref}$ is electrically coupled between the gate of the second TFT M2 of the reverse amplification circuit 320 and a node Va (a node A) that is electrically coupled to the gate of the first TFT M1 of the reverse amplification circuit 320. The reset TFT $M_{rst}$ has a gate electrically coupled to the scanning line $G_n$, a source electrically coupled to the node Va (the node A), and a drain electrically coupled to a readout control signal line, $R_{WS}$.

In operation, when the scanning line $G_n$ is turned on, and readout control signal line $R_{WS}$ is turned on, the voltage level of the node Va (the node A) is charged to a desired saturation level. The voltage level of the node B is determined by the ratio of the storage capacitor $C_{ref}$ and the touch sensing capacitor $C_{lc}$. The larger the touch sensing capacitor $C_{lc}$, indicating a touch event occurs, the lower the voltage level at the node B. The voltage level at the node C is determined by the turning-on degrees of the first TFT M1 and the second TFT M2. Thus, when the scanning line $G_{n-1}$ is turned on, the readout TFT $M_{sel}$ sends the sensed touch signal to the readout circuit (not shown) for process.

It should be appreciated by people skilled in the art that the touch sensing device 310 described herein can be utilized in the other embodiments of the present application.

FIG. 3(b) shows the output voltages Vout sensed for touch events in different conditions applied in the in-cell touch sensing panel 300, where initially $C_{lc}$=0.05p and Cref=0.05p, which illustrates the effects of Vgs, which is the voltage difference of the low voltage level of $G_n$ and the low voltage level of $R_{WS}$, on the circuit performance. According to the exemplary embodiment, the sensitivity and/or the operation of the in-cell touch sensing panel 300 can be optimized by properly adjusting Vgs of the reset TFT $M_{rst}$. For example, when Vgs=-3.5V, the voltage difference between the voltage outputs for bright ambient light (no touch event) and dark ambient light (a touch event) is about 0.84V, while the voltage difference between the voltage outputs for no press (no touch)

event and a press (touch) touch event is about 0.68V. In addition, for a fix value of Vgs, the output voltage Vout decreases as the press gap of a touch increases. However, for certain values of Vgs, for example, Vgs=−5V, when the press gaps are greater than 0.19 μm, the output voltage Vout is almost unchanged.

Referring to FIG. 4(a), an in-cell touch panel 400 is shown according to another embodiment of the present invention. The in-cell touch panel 400 has a touch sensing device 410 and a reverse amplification circuit 420 electrically coupled to the touch sensing device 410. The reverse amplification circuit 420 has the same circuit as that of the reverse amplification circuit 220 shown in FIG. 2(a). Similar to the touch sensing device 310 shown in FIG. 3(a), the touch sensing device 410 has a touch sensing capacitor, $C_{lc}$, a storage capacitor, $C_{ref}$, and a reset TFT, $M_{rst}$, except that the touch sensing device 410 also has an additional capacitor C1 electrically coupled between the gate of the first TFT M1 of the reverse amplification circuit 420 and the source of the reset TFT $M_{rst}$. In the exemplary embodiment, the voltage level at the node A is in accordance with the voltage level at the node Va, because of the coupling of the additional capacitor C1 and the node Va. As described above, when a touch exists, the sensed touch signal is amplified accordingly. It should be appreciated by people skilled in the art that the touch sensing device 410 described herein can also be used in the other embodiments of the present application.

The output voltages Vout sensed for touch events in different conditions applied in the in-cell touch sensing panel 400 are shown in FIG. 4(b), where initially $C_{lc}$=0.05p and Cref=0.05p. Similar to those shown in FIG. 3(b), the output voltages Vout plotted in FIG. 4(b) illustrate the effects of Vgs on the circuit performance. The sensitivity and/or the operation of the in-cell touch sensing panel 400 can be optimized by properly adjusting Vgs of the reset TFT $M_{rst}$. For example, when Vgs=−3.5V, the voltage difference between the voltage outputs for bright ambient light (no touch event) and dark ambient light (a touch event) is about 0.79V, while the voltage difference between the voltage outputs for no press (no touch) event and a press (touch) touch event is about 0.68V In addition, it is clear that for a fix value of Vgs, the output voltage Vout decreases as the press gap of a touch increases. However, for certain values of Vgs, for example, Vg=−5V, when the press gaps are greater than 0.19 μm, the output voltage Vout is almost unchanged. According to the embodiment of the present invention, the voltage difference between the voltage outputs for no touch event and a touch event is amplified.

Figure 5:
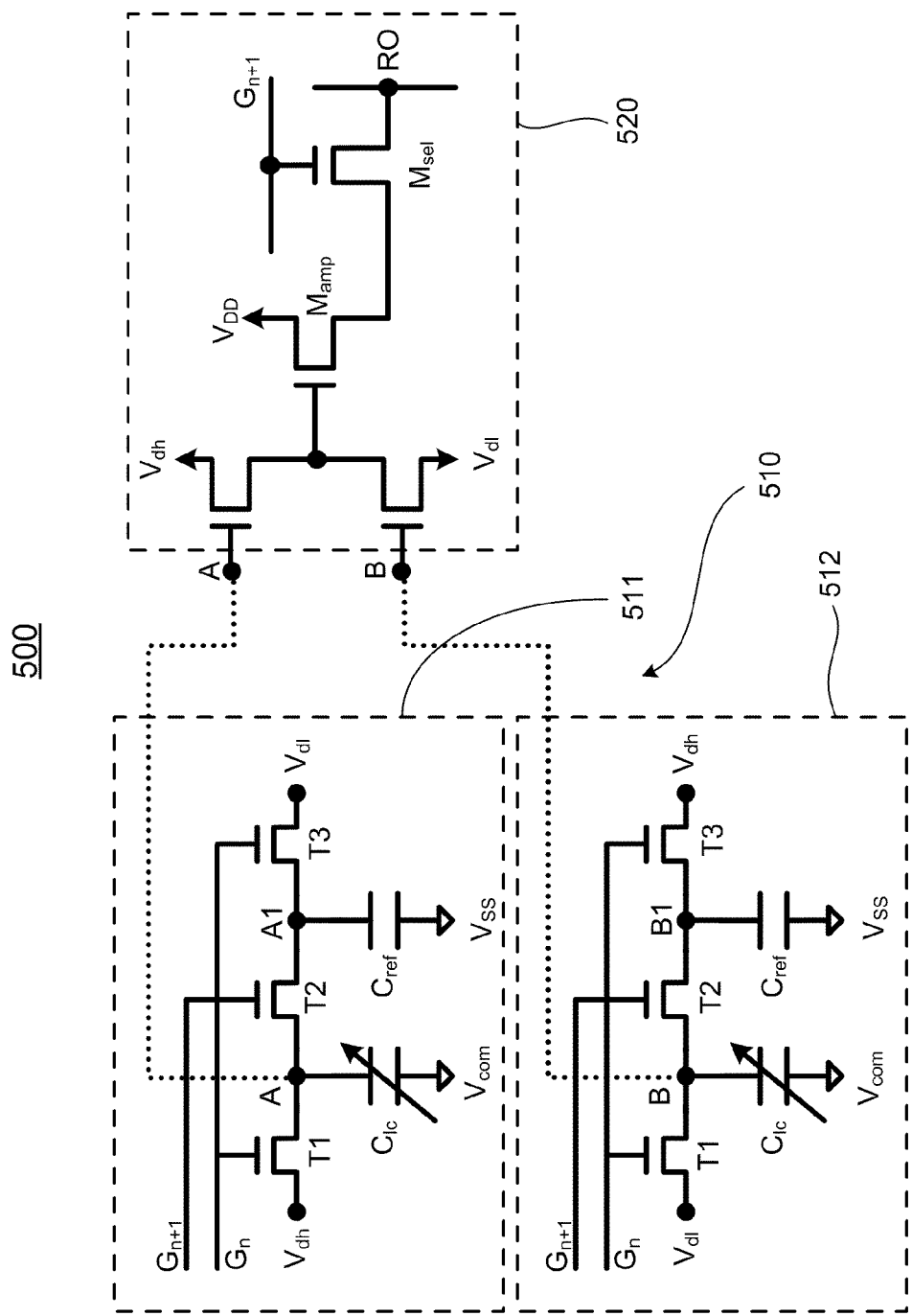
FIG. 5 shows schematically a circuit diagram of an in-cell touch sensing panel according to yet another embodiment of the present invention.
Figure 6:
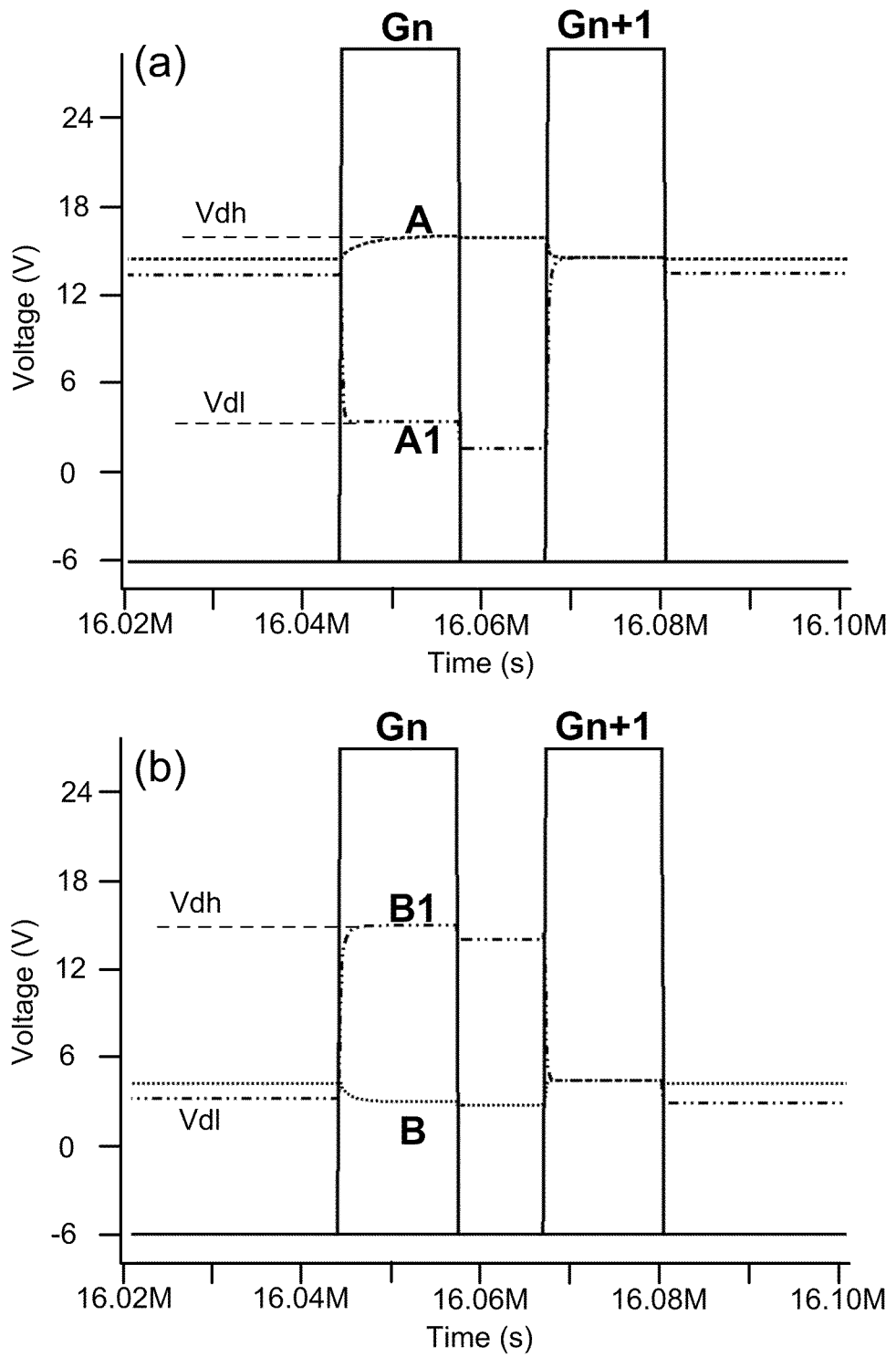
FIG. 6 shows schematically signal simulations (a) and (b) of the in-cell touch sensing panel as shown in FIG. 5.
Figure 7:
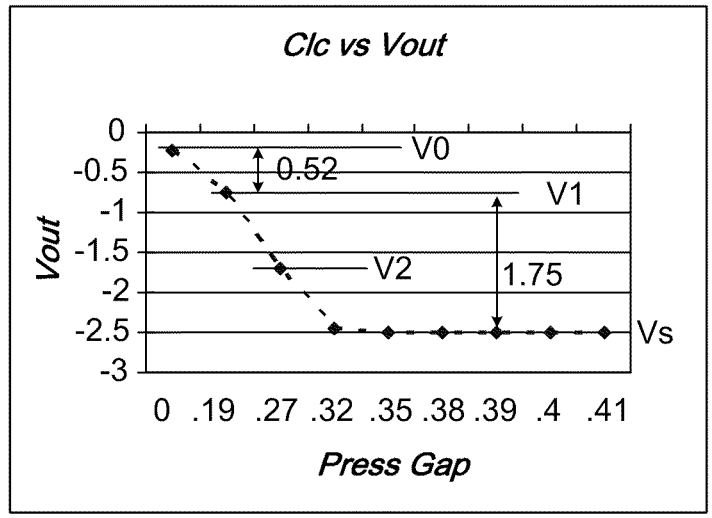
FIG. 7 shows schematically the output voltages (a) and (b) of the in-cell touch sensing panel as shown in FIG. 5.
Figure 7:
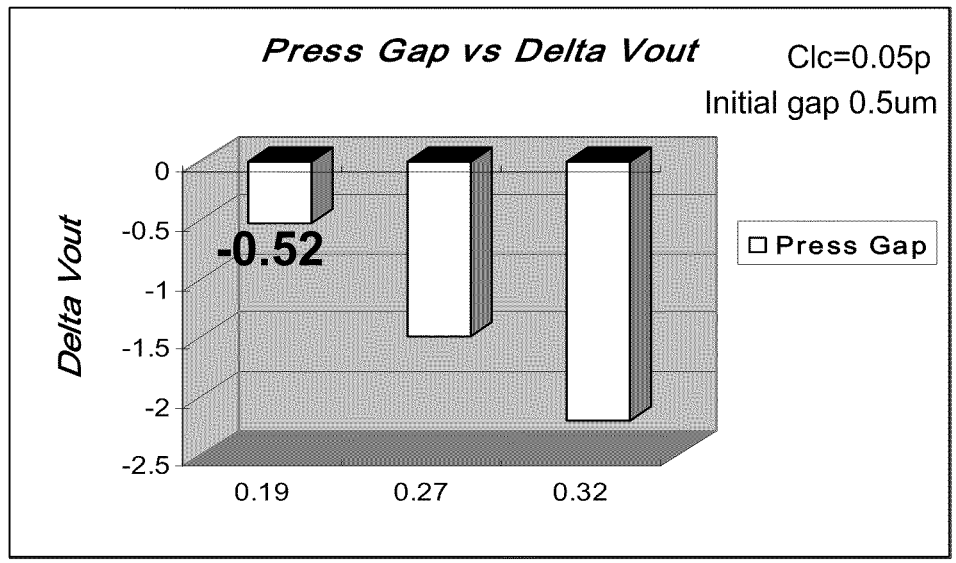

FIG. 5 shows an in-cell touch panel 500 according to yet another embodiment of the present invention. The in-cell touch panel 500 has a touch sensing device 510 and a reverse amplification circuit 520 electrically coupled to the touch sensing device 510. The reverse amplification circuit 520 has the same circuit as that of the reverse amplification circuit 220 shown in FIG. 2(a).

The touch sensing device 510 is characterized with a first charge sharing circuit 511 and a second charge sharing circuit 512. Each charge sharing circuit 511/512 has three transistors and two capacitors, a touch sensing capacitor, $C_{lc}$, and a storage (reference) capacitor $C_{ref}$. The first transistor T1 has a gate electrically coupled to the scanning line $G_n$, a source configured to receive one of the first and second bias voltages Vdh and Vdl, and a drain electrically coupled to a first node, respectively. The second transistor T2 has a gate electrically coupled to the second one of the scanning line $G_{n+1}$, a source electrically coupled to the first node, and a drain electrically coupled to a second node, respectively. The third transistor T3 has a gate electrically coupled to the scanning line $G_n$, a source electrically coupled to the second node, and a drain configured to receive the other of the first and second bias voltages Vdh and Vdl, respectively. The touch sensing capacitor $C_{lc}$ is electrically coupled between the first node and a common voltage, $V_{com}$. The reference capacitor $C_{ref}$ is electrically coupled between the second node and a reference voltage, $V_{SS}$.

The first and second bias voltages Vdh and Vdl have different (voltage) potential levels. For example, Vdh>Vdl. The first bias voltage Vdh can be same as a power supply voltage $V_{DD}$, i.e., Vdh=$V_{DD}$, or different voltages. The second bias voltage Vdl can be a ground voltage $V_{GND}$, a reference voltage $V_{SS}$, a negative voltage $V_{EE}$, or others. The value of the touch sensing capacitor $C_{lc}$ is determined by whether or not a touch event exists. When no touch occurs, the value of the touch sensing capacitor $C_{lc}$ is very small. Otherwise, it is larger.

For the first charge sharing circuit 511, the source of the first transistor T1 receives the first bias voltage Vdh and the drain of the third transistor T3 receives the second bias voltage Vdl, the first node A of the first charge sharing circuit 511 is electrically coupled to the gate of the first TFT M1 of the reverse amplification circuit 520. When the scanning line $G_n$ is turned on, the node A is charged to the level of Vdh, while the node A1 is charged to the level of Vdl. When the scanning line $G_{n+1}$ is turned on, the charge sharing starts. The value of the touch sensing capacitor $C_{lc}$ increases when a touch event exists. As a result of the charge sharing, the voltage level of the node A1 tends towards the level of Vdh, when a touch occurs, as shown in FIG. 6(a).

For the second charge sharing circuit 512, the source of the first transistor T1 receives the second bias voltage Vdl and the drain of the third transistor T3 receives the first bias voltage Vdh, the first node B of the first charge sharing circuit 512 is electrically coupled to the gate of the second TFT M2 of the reverse amplification circuit 520. When the scanning line $G_n$ is turned on, the node B is charged to the level of Vdl, while the node B1 is charged to the level of Vdh. When the scanning line $G_{n+1}$ is turned on, the charge sharing starts. The value of the touch sensing capacitor $C_{lc}$ increases when a touch event exists. As a result of the charge sharing, the voltage level of the node B1 tends towards the level of Vdl, when a touch occurs, as shown in FIG. 6(b).

Thus, when a touch occurs, it causes the first charge sharing circuit 511 to raise the gate voltage level of the first TFT M1 towards the level of Vdh, and the second charge sharing circuit 512 to lower the gate voltage level of the second TFT M2 towards the level of Vdl. The resultant touch signals from the first and second charge sharing circuit 511 and 512 are reversely amplified by the reverse amplification circuit 520.

FIGS. 7(a) and 7(b) show the output voltages of the in-cell touch sensing panel 500 as shown in FIG. 5 in response to touch events, where the initial gap is about 0.05 μm and $C_{lc}$=0.05p. As shown in FIG. 7(a), when no touch occurs, the output voltage Vout=V0, for example. However, when a touch occurs, the output voltage will decrease, and the amount of the voltage decrease is dependent upon the touch sensing capacitor $C_{lc}$, i.e., the press gaps of the touch. For example, when the press gap is about 0.19 μm, the output voltage Vout=V1. As a result of this touch, the voltage decrease (or difference), Delta_Vout, is about −0.52V, as shown in FIG. 7(b). When the press gap is about 0.27 μm, the output voltage Vout=V2, which is further decreased from V0. When the press gap of the touch is about 0.32 μm, the output voltage Vout=Vs, which decreases 1.75V from V1. However, when the press gaps are greater than 0.32 μm, the output voltage Vout=Vs, which is almost unchanged. Thus, according to the embodiment of the in-cell touch sensing panel 500, the maximal voltage difference Delta_Vout between a touch event and no touch event is about 2.22V.

It should be appreciated by people skilled in the art that the touch sensing device 510 described herein can also be utilized in the other embodiments of the present application.

Referring to FIG. 8(a), an in-cell touch panel 800 is shown according to one embodiment of the present invention. The in-cell touch panel 800 has a touch sensing device 810, a reverse amplification circuit 820 electrically coupled to the touch sensing device 810, and a readout circuit 830. The touch sensing device 810 is same as the touch sensing device 510 shown in FIG. 5. The readout circuit 830 is identical to readout circuit 230 shown in FIG. 2(a).

The reverse amplification circuit 820 has an amplification TFT, $M_{amp}$, having a gate electrically coupled to the touch sensing device 810 via the node A, a source and a drain electrically coupled to the touch sensing device 810 via the node B, and a selection TFT, $M_{sel}$, having a gate electrically coupled to the scanning line $G_{n+1}$, a source electrically coupled to a signal readout line, RO, and a drain electrically coupled to the source of the amplification TFT $M_{amp}$. The touch sensing device 810 is configured such that when a touch occurs, it causes a current signal 822 to flow between the amplification TFT $M_{amp}$ in a reverse direction relative to that 821 when no touch occurs. When no touch occurs, the potential (voltage) levels of the nodes A and B are positive. The current signal 821 flows into the readout circuit (IC integrator) 830. When a touch exists, the voltage level of the node A is still positive, while the voltage level of the node B is negative. The current signal 822 flows into the readout circuit (IC integrator) 830. Thus, the touch signal amplification is based on the difference of the current signals 821 and 822. FIG. 8(b) shows the output voltages against the sensing time. The plots 831 and 832 are corresponding to the output voltages from the readout line RO for no touch event and a touch event, respectively. It is clearly shown that according to this embodiment of the present invention, the voltage difference between the output voltage for no touch event, untouched_Vout, and the output voltage for a touch event, touched_Vout, is amplified.

Figure 8:
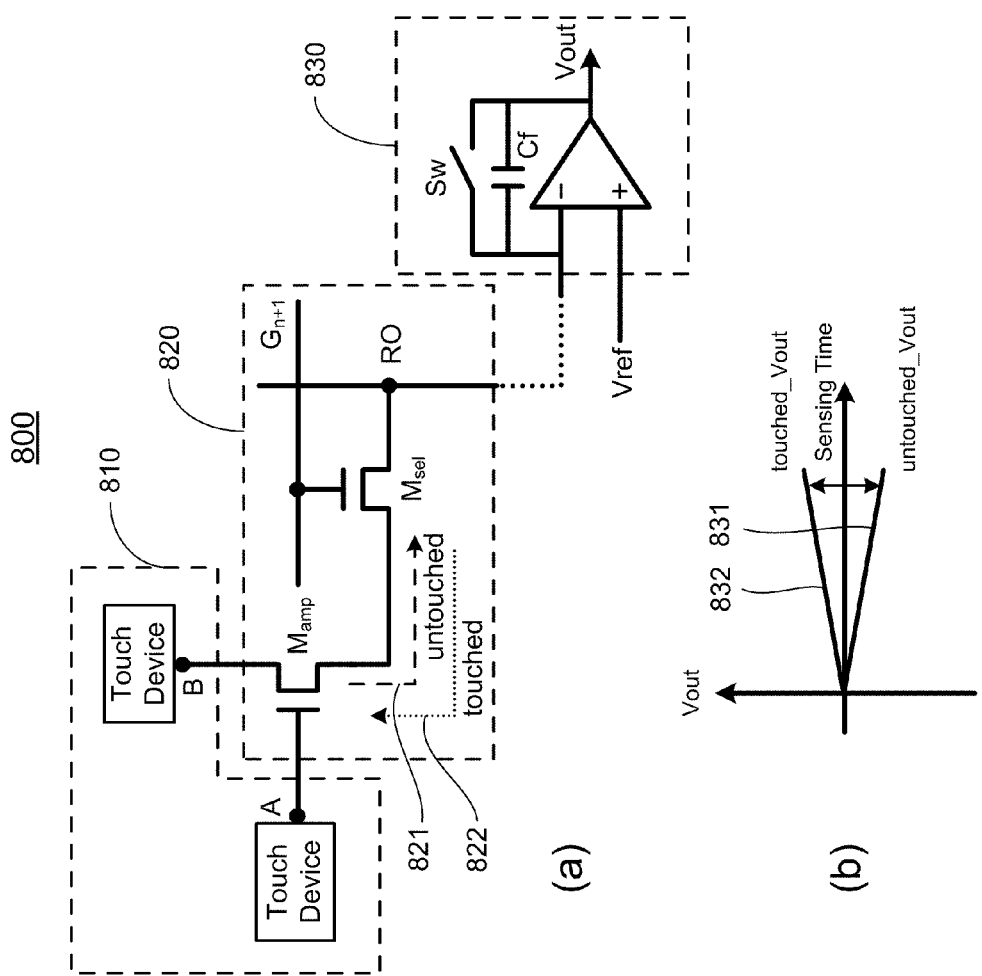
FIG. 8 shows schematically an in-cell touch sensing panel according to one embodiment of the present invention, (a) a circuit diagram of the in-cell touch sensing panel, and (b) plots of the output voltages against the sensing time.
Figure 9:
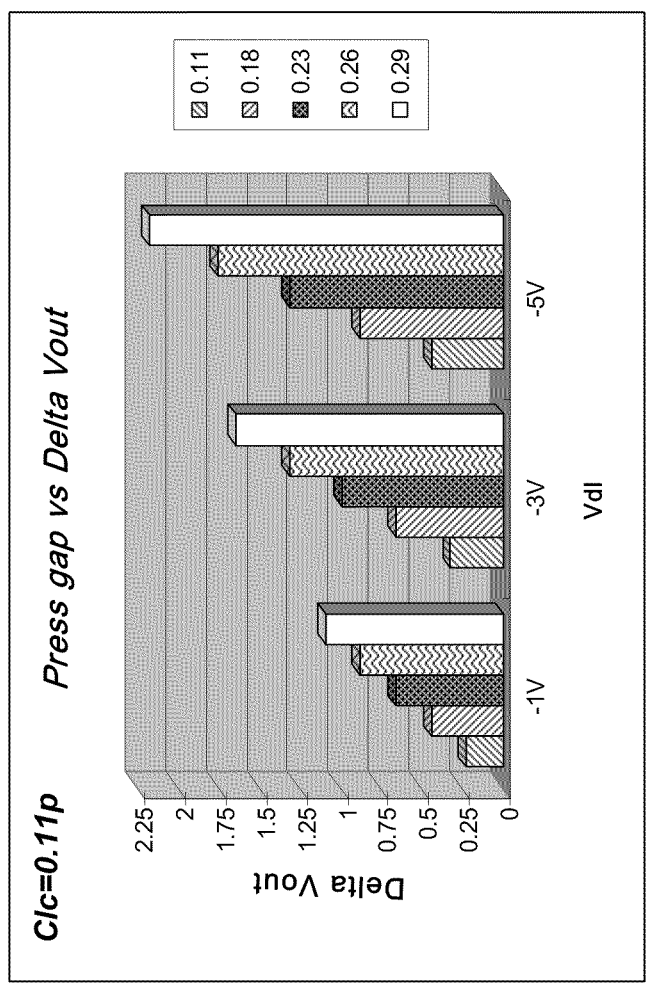
FIG. 9 shows schematically the output voltages of the in-cell touch sensing panel as shown in FIG. 8.
Figure 10:
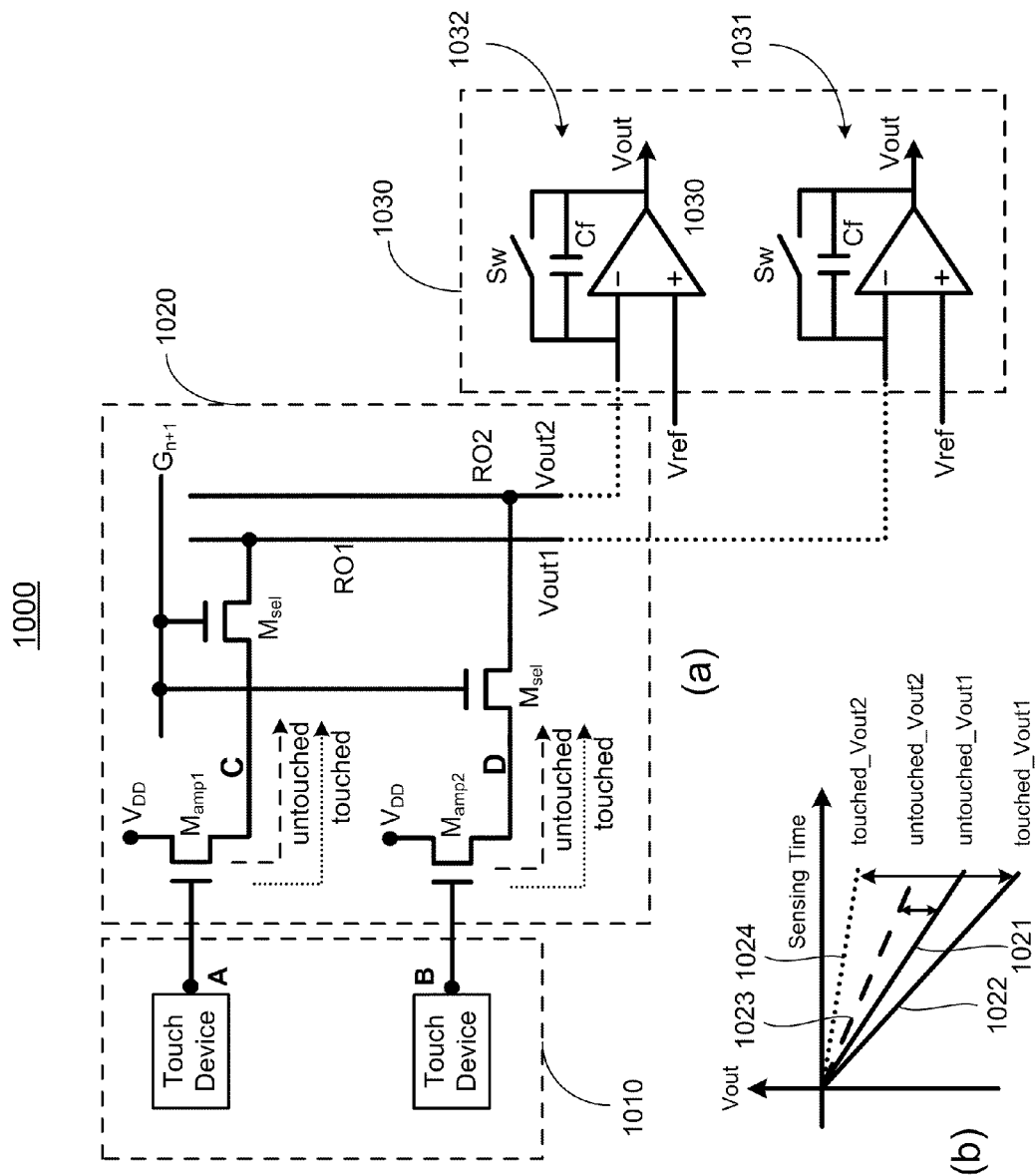
FIG. 10 shows schematically an in-cell touch sensing panel according to another embodiment of the present invention, (a) a circuit diagram of the in-cell touch sensing panel, and (b) plots of the output voltages against the sensing time.
Figure 11:
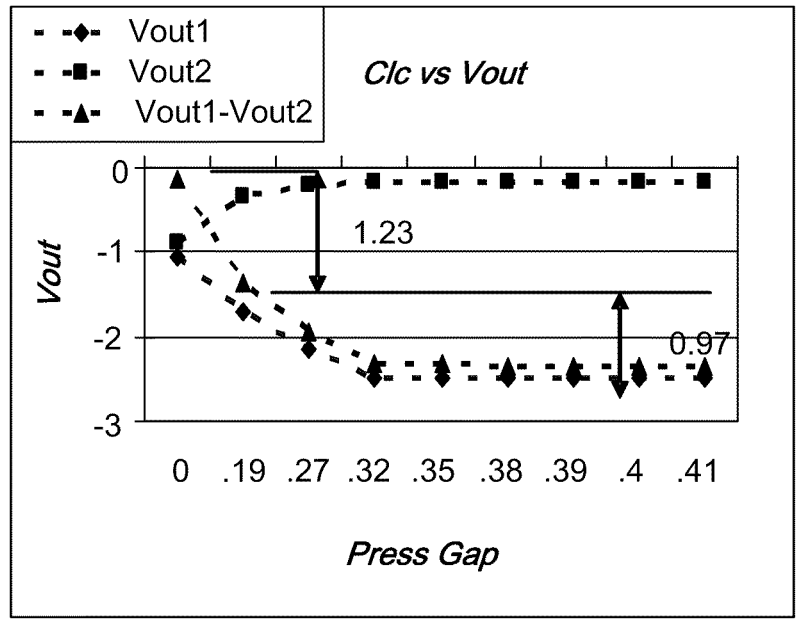
FIG. 11 shows schematically the output voltages (a) and (b) of the in-cell touch sensing panel as shown in FIG. 10.
Figure 11:
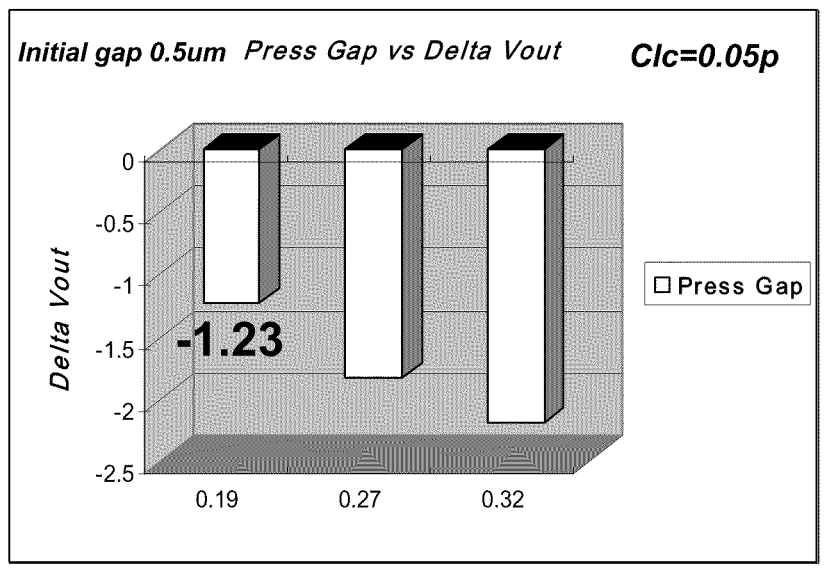

FIG. 9 shows the output voltages of the in-cell touch sensing panel 800 as shown in FIG. 8 in response to different touch events, where initially $C_{lc}$=0.11p. It is clear that the voltage difference, Delta_Vout, is dependent upon the press gap of a touch and the bias voltage, for example, Vdl. Generally, the lower the second bias voltage Vdl is, the larger the voltage difference Delta_Vout is. Further, the larger the press gap is, the the larger the voltage difference Delta_Vout is. For example, for the same press gap, For Vdl=−5V, the voltage difference Delta_Vout is larger than that for Vdl=−3V, which in turn, is larger than that for Vdl=−1V. For the same second bias voltage Vdl, the voltage difference Delta_Vout for the press gap of 0.29 μm is larger than that for the press gap of 0.26 μm, which in turn, is larger than that for the press gap of 0.23 μm, and so on.

Referring to FIG. 10(a), an in-cell touch panel 1000 is shown according to one embodiment of the present invention. The in-cell touch panel 1000 has a touch sensing device 1010, a reverse amplification circuit 1020 electrically coupled to the touch sensing device 1010, and a readout circuit 1030 including a first readout circuit 1031 and a second readout circuit 1032. The touch sensing device 1010 is same as the touch sensing device 510 shown in FIG. 5. Each of the first and second readout circuits 1031 and 1032 is identical to readout circuit 230 shown in FIG. 2(a).

The reverse amplification circuit 1020 has two amplification TFTs and two selection TFTs. The first amplification TFT, $M_{amp1}$, has a gate electrically coupled to the touch sensing device 1010 via the node A, a source and a drain configured to receive the power supply voltage $V_{DD}$. The first selection TFT, $M_{sel1}$, has a gate electrically coupled to the scanning line $G_{n-1}$, a source electrically coupled to a first signal readout line, RO1, for output a first output signal, Vout1, and a drain electrically coupled to the source of the first amplification TFT $M_{amp1}$. The second amplification TFT, $M_{amp2}$, has a gate electrically coupled to the touch sensing device 1010 via the node B, a source and a drain configured to receive the power supply voltage $V_{DD}$. The second selection TFT, $M_{sel2}$, has a gate electrically coupled to the scanning line $G_{n+1}$, a source electrically coupled to a second signal readout line, RO2, for output a second output signal, Vout2, and a drain electrically coupled to the source of the second amplification TFT, $M_{amp2}$.

When no touch event exists, both the first amplification TFT $M_{amp1}$ and the second amplification TFT $M_{amp2}$ contribute the same amount of the currents. When a touch occurs, the gate voltage level of the first amplification TFT $M_{amp1}$ is pulled up, which makes its current become larger, while the gate voltage level of the second amplification TFT $M_{amp2}$ is pulled down, which makes its current become smaller or makes the second amplification TFT $M_{amp2}$ be turned off, thereby amplifying the signal difference.

FIG. 10(b) shows the output voltages against the sensing time. The plots 1021 and 1022 are corresponding to the output voltages from the first readout line RO1 for no touch event and a touch event, respectively. The plots 1023 and 1024 are corresponding to the output voltages from the second readout line RO2 for no touch event and a touch event, respectively. It can be found that the voltage difference between touch_Vout2 and touch_Vout1 is very large for a touch event.

FIGS. 11(a) and 11(b) show the output voltages of the in-cell touch sensing panel 1000 as shown in FIG. 10(a) in response to touch events, where the initial gap is about 0.05 μm and $C_{lc}$=0.05p. For this embodiment, the output voltage Vout1 from the first readout line RO1 decreases as the press gap of a touch increases, while the output voltage Vout2 from the second readout line RO1 increases as the press gap of a touch increases, as shown in FIG. 11(a). Accordingly, a touch event causes the output voltage difference Delta_Vout from the first and second readout lines RO1 and RO2 increased (amplified) significantly. For example, for the press gap of 0.19 μm, Delta_Vout=−1.23V, as shown in FIG. 11(b).

Figure 12:
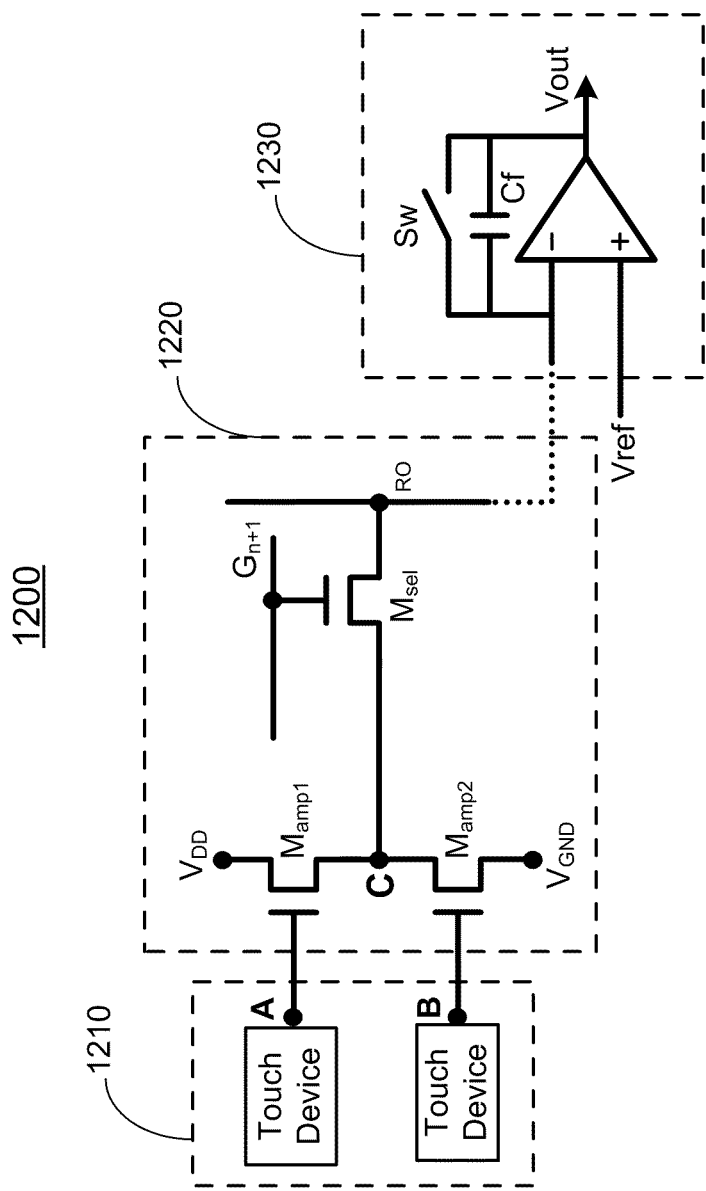
FIG. 12 shows schematically an in-cell touch sensing panel according to yet another embodiment of the present invention, (a) a circuit diagram of the in-cell touch sensing panel, and (b) plots of the output voltages against the sensing time.
Figure 13:
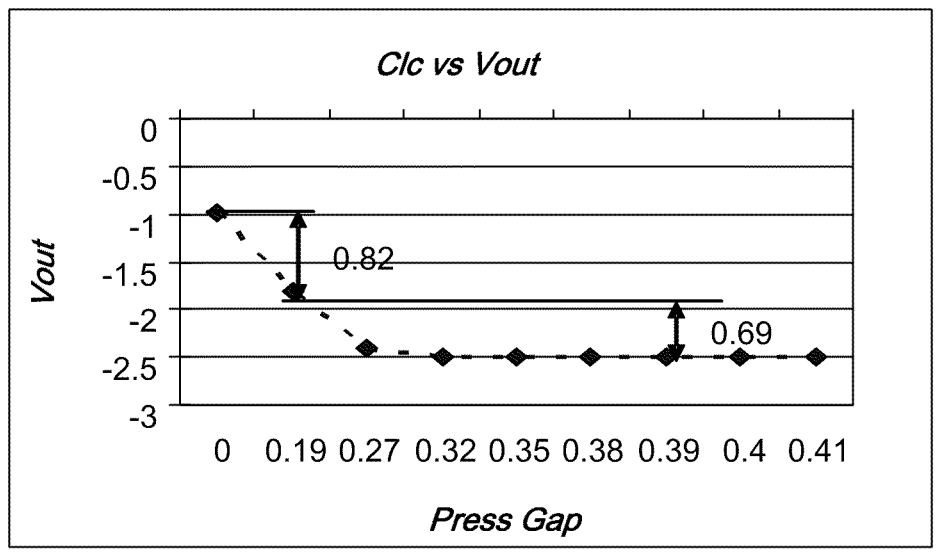
FIG. 13 shows schematically the output voltages (a) and (b) of the in-cell touch sensing panel as shown in FIG. 12.
Figure 13:
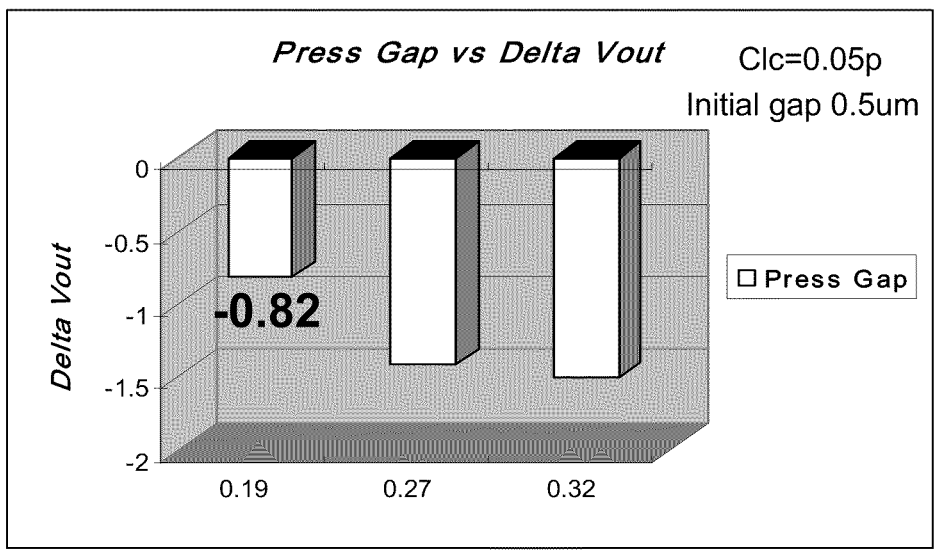
Figure 14:
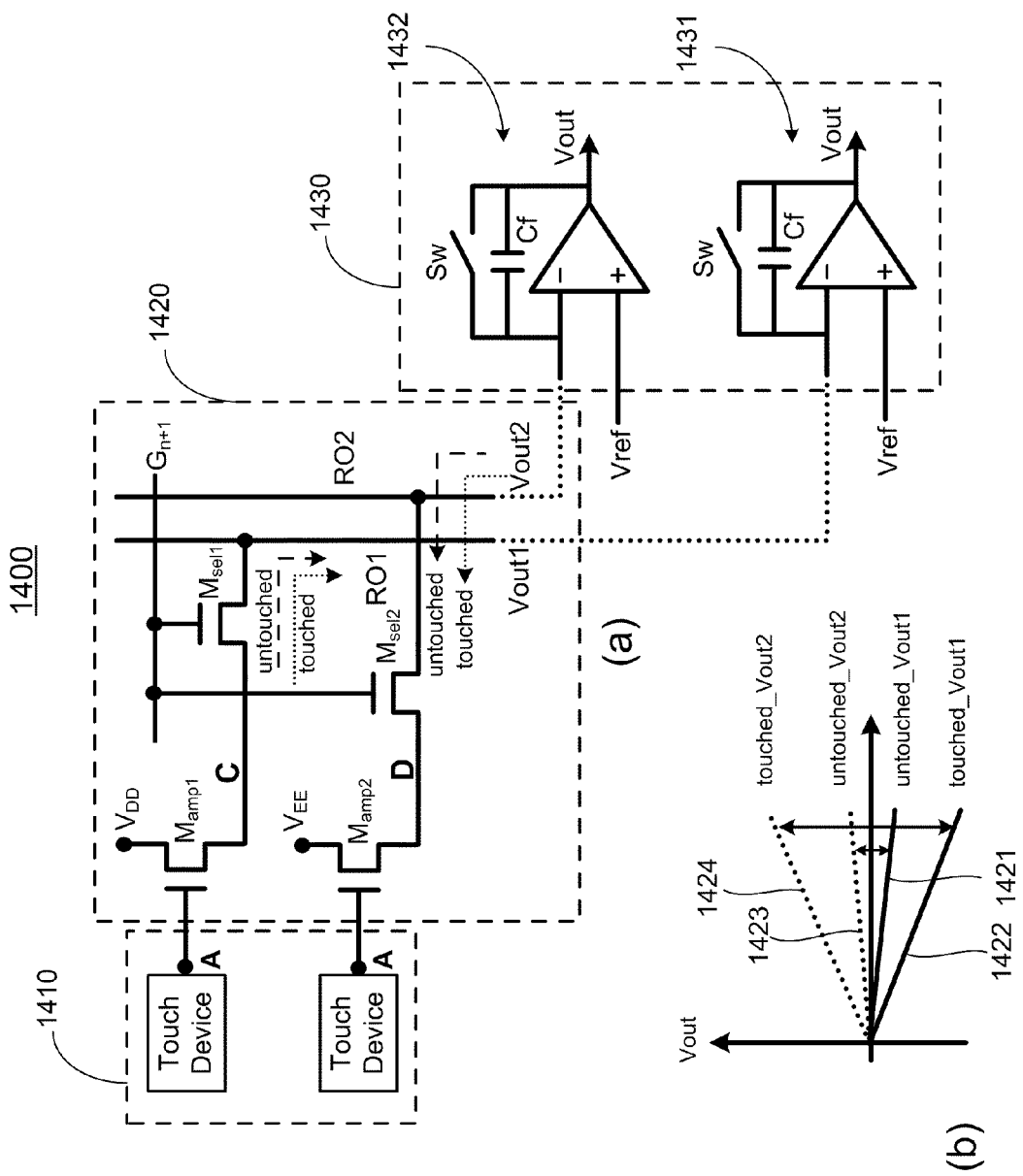
FIG. 14 shows schematically an in-cell touch sensing panel according to an alternative embodiment of the present invention, (a) a circuit diagram of the in-cell touch sensing panel, and (b) plots of the output voltages against the sensing time.
Figure 15:
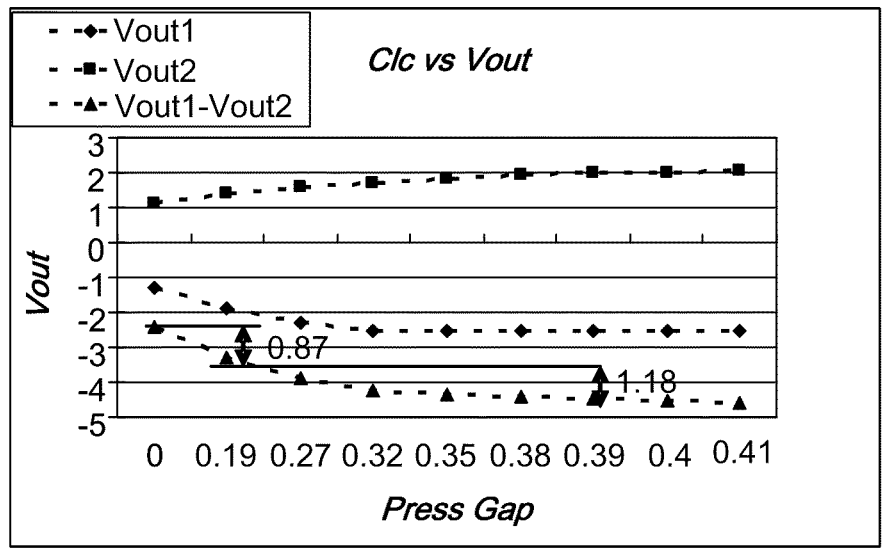
FIG. 15 shows schematically the output voltages (a) and (b) of the in-cell touch sensing panel as shown in FIG. 14.
Figure 15:
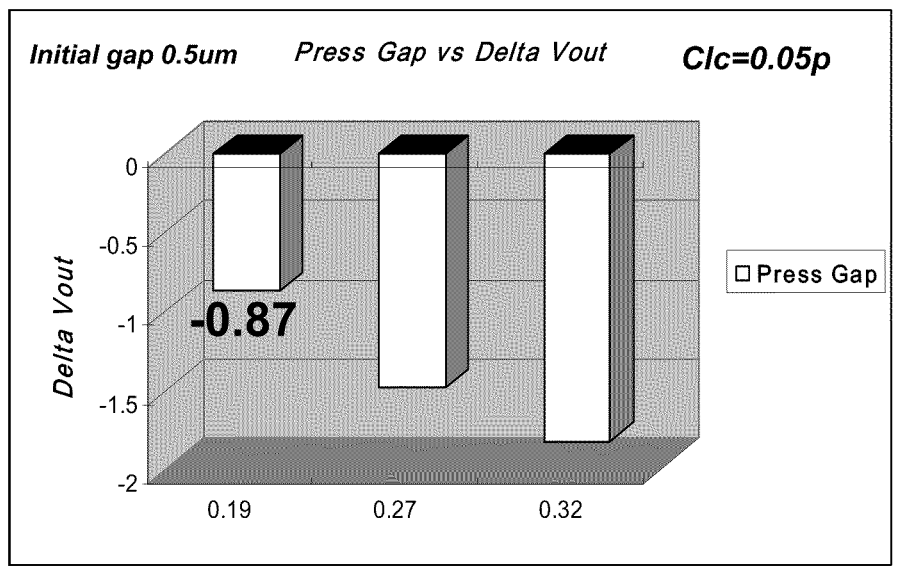
Figure 16:
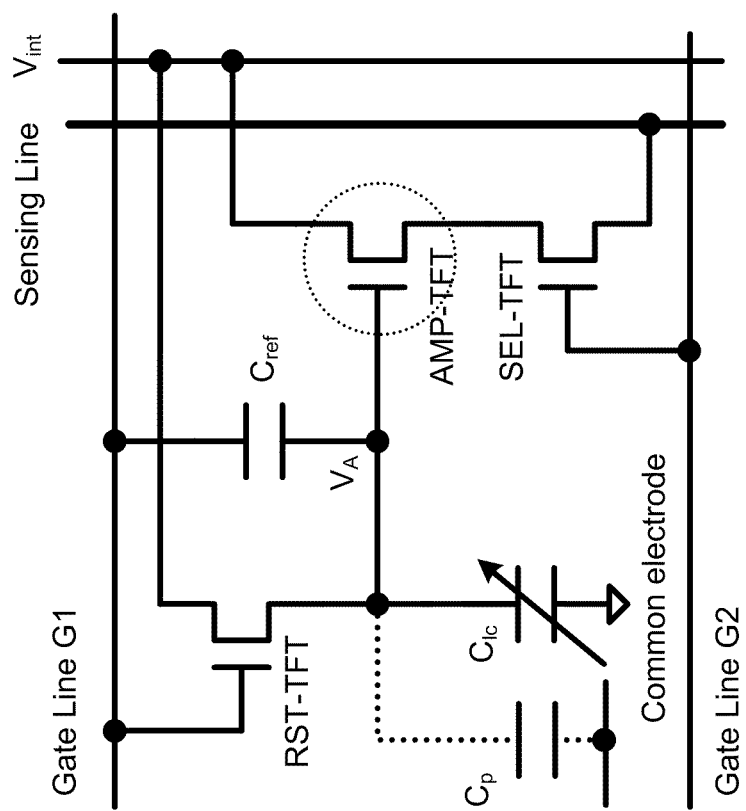
FIG. 16 shows a circuit diagram of a conventional in-cell touch sensing panel.
Figure 17:
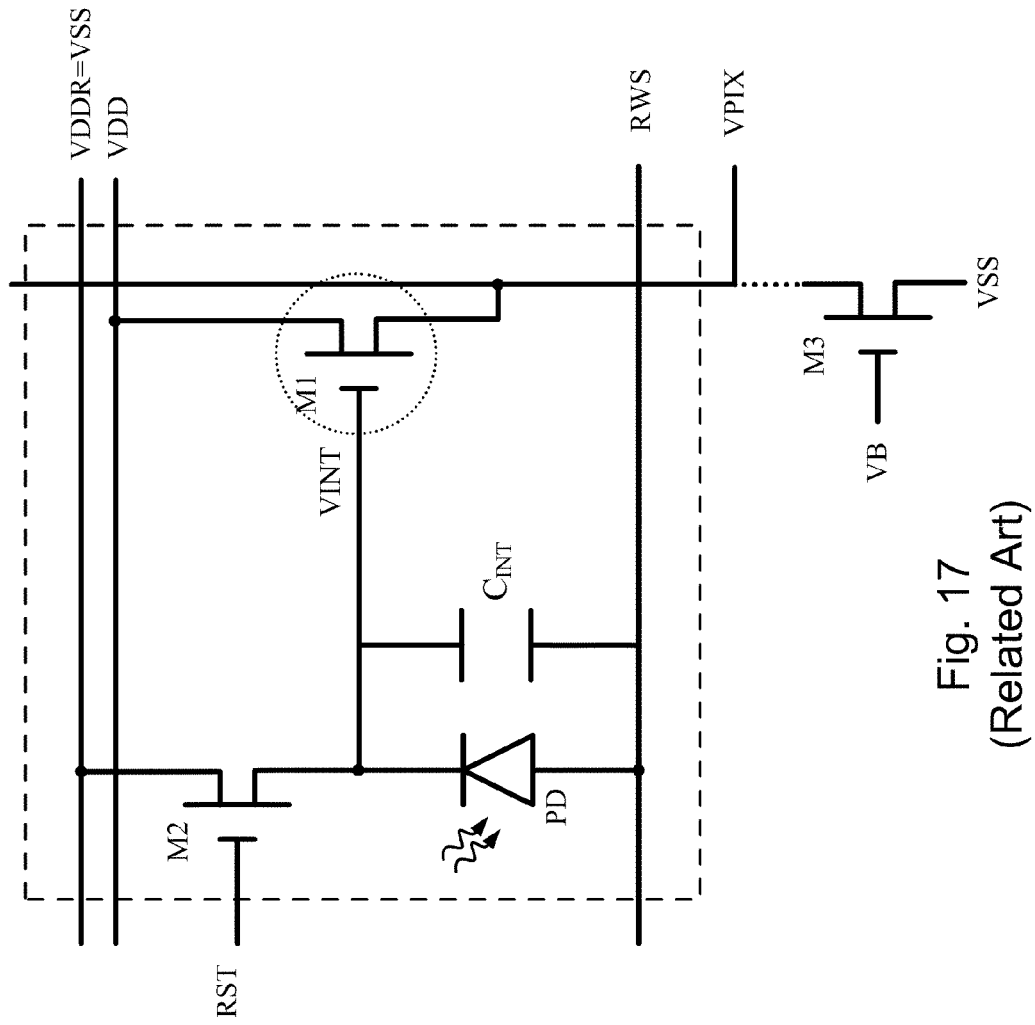
FIG. 17 shows a circuit diagram of another conventional in-cell touch sensing panel.
Figure 18:
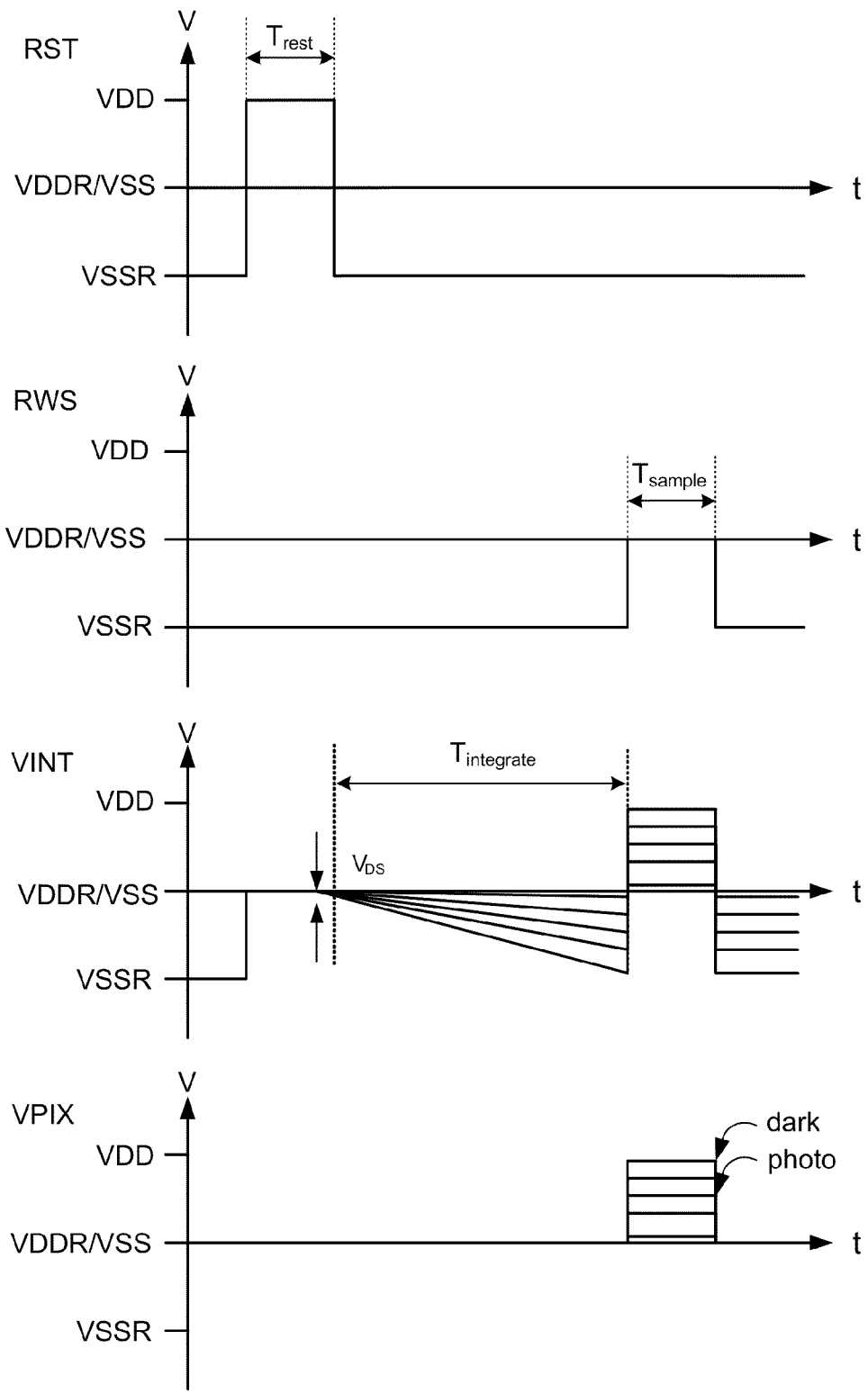
FIG. 18 shows timing charts of operation signals of the conventional in-cell touch sensing panel as shown in FIG. 17.

FIG. 12 shows an in-cell touch panel 1200 according to another embodiment of the present invention. The in-cell touch panel 1200 has a touch sensing device 1210, a reverse amplification circuit 1220 electrically coupled to the touch sensing device 1210, and a readout circuit 1230. The touch sensing device 1210 is same as the touch sensing device 510 shown in FIG. 5. The readout circuit 1230 is identical to readout circuit 230 shown in FIG. 2(a).

The reverse amplification circuit 1220 has two amplification TFTs and a selection TFT. The first amplification TFT, $M_{amp1}$, has a gate electrically coupled to the touch sensing device 1210 via the node A, a source and a drain configured to receive the power supply voltage $V_{DD}$. The second amplification TFT, $M_{amp2}$, has a gate electrically coupled to the touch sensing device 1210 via the node B, a source configured to receive the ground voltage $V_{GND}$ and a drain electrically coupled to the source of the first amplification TFT $M_{amp1}$. The selection TFT, $M_{sel1}$, has a gate electrically coupled to the scanning line $G_{n+1}$, a source electrically coupled to a first signal readout line RO1, and a drain electrically coupled to both the source of the first amplification TFT $M_{amp1}$ and the drain of the second amplification TFT $M_{amp2}$.

When no touch event exists, both the first amplification TFT $M_{amp1}$ and the second amplification TFT $M_{amp2}$ contribute the same amount of the currents. When a touch occurs, the gate voltage level of the first amplification TFT $M_{amp1}$ is pulled up, which makes its current become larger, while the gate voltage level of the second amplification TFT $M_{amp2}$ is pulled down, which makes its current become smaller or makes the second amplification TFT $M_{amp2}$ be turned off, thereby amplifying the signal difference.

FIGS. 13(a) and 13(b) show the output voltages of the in-cell touch sensing panel 1200 as shown in FIG. 12 in response to touch events. Similar to the results shown in FIGS. 7(a) and 7(b), the output voltage Vout from the readout line RO decreases as the press gap of a touch increases. However, when the press gaps are greater than 0.32 μm, the output voltage Vout is almost unchanged.

Referring to FIG. 14(a), an in-cell touch panel 1400 is shown according to one embodiment of the present invention. The circuitry of the in-cell touch panel 1400 is same as that of the in-cell touch panel 1000 shown in FIG. 10(a), except that the voltage levels applied to the gates and drains of the first amplification TFT, $M_{amp1}$ and the second amplification TFT, $M_{amp2}$ are different.

The in-cell touch panel 1400 has a touch sensing device 1410, a reverse amplification circuit 1420 electrically coupled to the touch sensing device 1410, and a readout circuit 1430 including a first readout circuit 1431 and a second readout circuit 1432. The reverse amplification circuit 1420 has two amplification TFTs and two selection TFTs. The first amplification TFT, $M_{amp1}$, has a gate electrically coupled to the touch sensing device 1410 via the node A, a source and a drain configured to receive the power supply voltage $V_{DD}$. The first selection TFT, $M_{sel1}$, has a gate electrically coupled to the scanning line $G_{n-1}$, a source electrically coupled to a first signal readout line, RO1, for output a first output signal, Vout1, and a drain electrically coupled to the source of the first amplification TFT $M_{amp1}$. The second amplification TFT, $M_{amp2}$, has a gate electrically coupled to the touch sensing device 1410 via the node A, a source and a drain configured to receive a negative voltage $V_{EE}$. The second selection TFT, $M_{sel2}$, has a gate electrically coupled to the scanning line $G_{n+1}$, a source electrically coupled to a second signal readout line, RO2, for output a second output signal, Vout2, and a drain electrically coupled to the source of the second amplification TFT, $M_{amp2}$.

For such a configuration, the gates of both the first amplification TFT, $M_{amp1}$ and the second amplification TFT, $M_{amp2}$ are electrically coupled to the touch sensing device 1410 via the node A. The drain of the first amplification TFT, $M_{amp1}$ is coupled to a high voltage level, $V_{DD}$, while the drain of the second amplification TFT, $M_{amp2}$ is coupled to a low voltage level, $V_{EE}$.

FIG. 14(b) shows the output voltages against the sensing time. The plots 1421 and 1422 are corresponding to the output voltages from the first readout line RO1 for no touch event and a touch event, respectively. The plots 1423 and 1424 are corresponding to the output voltages from the second readout line RO2 for no touch event and a touch event, respectively. It can be found that the voltage difference between touch_Vout2 and touch_Vout1 is very large for a touch event.

FIGS. 15(a) and 15(b) show the output voltages of the in-cell touch sensing panel 1400 as shown in FIG. 14(a) in response to touch events, where the initial gap is about 0.05 μm and $C_{lc}$=0.05p. For this embodiment, the output voltage Vout1 from the first readout line RO1 decreases as the press gap of a touch increases, while the output voltage Vout2 from the second readout line RO1 increases as the press gap of a touch increases, as shown in FIG. 15(a). Accordingly, a touch event causes the output voltage difference Delta_Vout from the first and second readout lines RO1 and RO2 increased (amplified) dramatically. For example, for the press gap of 0.19 μm, Delta_Vout=-0.87V, as shown in FIG. 15(b).

In sum, the present invention, among other things, discloses an in-cell touch sensing panel that utilizes a reverse amplification circuit to amplify touch signal difference, thereby improving the sensitivity of the in-cell touch sensing panel.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An in-cell touch panel, comprising:
  (a) a plurality of pixels spatially arranged in a matrix;
  (b) a plurality of scanning lines, each scanning line electrically coupled to a corresponding pixel row of the pixel matrix;
  (c) at least one touch sensing device electrically coupled between two neighboring scanning lines and associated with a pixel therebetween; and
  (d) at least one reverse amplification circuit comprising:
    (i) a first thin-film transistor (TFT) having a gate electrically coupled to the at least one touch sensing device, a source and a drain configured to receive a first bias voltage, Vdh;
    (ii) a second TFT having a gate electrically coupled to the at least one touch sensing device, a source configured to receive a second bias voltage, Vdl, and a drain electrically coupled to the source of the first TFT;
    (iii) an amplification TFT having a gate electrically coupled to both the source of the first TFT and the drain of the second TFT, a source and a drain configured to receive a power supply voltage, VDD; and
    (iv) a selection TFT having a gate electrically coupled to one of the two neighboring scanning lines, a source electrically coupled to a signal readout line and a drain electrically coupled to the source of the amplification TFT,
  wherein the at least one touch sensing device is configured such that when a touch occurs, it causes a gate voltage level of one of the first TFT and the second TFT to increase and the gate voltage level of the other to decrease; and wherein Vdh>Vdl, and wherein the at least one touch sensing device is characterized with a first charge sharing circuit and a second charge sharing circuit, each charge sharing circuit comprising:
    a first transistor, T1, having a gate electrically coupled to the first one of the two neighboring scanning lines, a source configured to receive one of the first and second bias voltages Vdh and Vdl, and a drain electrically coupled to a first node, respectively;

a second transistor, T2, having a gate electrically coupled to the second one of the two neighboring scanning lines, a source electrically coupled to the first node, and a drain electrically coupled to a second node, respectively;

a third transistor, T3, having a gate electrically coupled to the first one of the two neighboring scanning lines, a source electrically coupled to the second node, and a drain configured to receive the other of the first and second bias voltages Vdh and Vdl, respectively;

a touch sensing capacitor, Clc, electrically coupled between the first node and a common voltage, Vcom; and a reference capacitor Cref electrically coupled between the second node and a reference voltage, VSS.

2. The in-cell touch panel of claim 1, wherein the at least one touch sensing device comprises a photo-type, press-type, capacitive-type or hybrid-type touch sensing device.

3. The in-cell touch panel of claim 2, wherein the at least one touch sensing device comprises:
(a) a touch sensing capacitor, Clc, electrically coupled between the gate of the second TFT and a common voltage, Vcom;
(b) a reference capacitor Cref electrically coupled between the gate of the second TFT and a node Va that is electrically coupled to the gate of the first TFT; and
(c) a reset TFT having a gate electrically coupled to one of the two neighboring scanning lines, a source electrically coupled to the node Va, and a drain electrically coupled to a readout control signal line.

4. The in-cell touch panel of claim 3, wherein the at least one touch sensing device further comprises an additional capacitor C1 electrically coupled between the gate of the first TFT and the node Va.

5. The in-cell touch panel of claim 3, wherein the at least one touch sensing device further comprises a photo sensor.

6. The in-cell touch panel of claim 1, wherein the first node of the first charge sharing circuit is electrically coupled to the gate of the first TFT, when the source of the first transistor T1 receives the first bias voltage Vdh and the drain of the third transistor T3 receives the second bias voltage Vdl, and wherein the first node of the second charge sharing circuit is electrically coupled to the gate of the second TFT, when the source of the first transistor T1 receives the second bias voltage Vdl and the drain of the third transistor T3 receives the first bias voltage Vdh.

7. The in-cell touch panel of claim 1, further comprising a readout circuit electrically couple to the readout signal line for outputting a touch sensing signal.

8. The in-cell touch panel of claim 7, wherein the readout circuit comprises:
(a) an operational amplifier (op-amp) having an inverting terminal electrically coupled to the readout signal line and a non-inverting terminal configured to receive a reference voltage, Vref, and an output terminal for outputting the touch sensing signal;
(b) a capacitor, Cf, electrically coupled between the inverting terminal and the output terminal of the op-amp; and
(c) a switch SW electrically coupled with the capacitor Cf in parallel.

* * * * *